United States Patent
Wagster et al.

(10) Patent No.: US 9,923,931 B1
(45) Date of Patent: Mar. 20, 2018

(54) SYSTEMS AND METHODS FOR IDENTIFYING VIOLATION CONDITIONS FROM ELECTRONIC COMMUNICATIONS

(71) Applicant: Digital Reasoning Systems, Inc., Franklin, TN (US)

(72) Inventors: John Wagster, Franklin, TN (US); Robert Metcalf, Franklin, TN (US); Keith Ellis Massey, Nashville, TN (US); Kenneth Loran Graham, Nashville, TN (US); Sarah Cannon, Franklin, TN (US); Adam Jaggers, Franklin, TN (US); Vishnuvardhan Balluru, Franklin, TN (US); Bill Dipietro, Franklin, TN (US)

(73) Assignee: Digital Reasoning Systems, Inc., Franklin, TN (US)

( * ) Notice: Subject to any disclaimer, the term of this patent is extended or adjusted under 35 U.S.C. 154(b) by 0 days.

(21) Appl. No.: 15/017,388

(22) Filed: Feb. 5, 2016

(51) Int. Cl.
*G06F 7/04* (2006.01)
*H04L 29/06* (2006.01)
*H04L 12/26* (2006.01)

(52) U.S. Cl.
CPC ............ *H04L 63/30* (2013.01); *H04L 43/10* (2013.01)

(58) Field of Classification Search
CPC ................................................ H04L 29/06877
See application file for complete search history.

(56) References Cited

U.S. PATENT DOCUMENTS

| 5,056,021 | A | 10/1991 | Ausborn |
| 7,444,403 | B1 * | 10/2008 | Packer ............... G06F 21/6218 704/9 |
| 7,606,714 | B2 | 10/2009 | Williams et al. |
| 7,627,466 | B2 | 12/2009 | Ramsey et al. |
| 8,145,562 | B2 | 3/2012 | Wasserblat et al. |
| 8,145,708 | B2 | 3/2012 | Biggs et al. |
| 8,588,825 | B2 | 11/2013 | Jonsson et al. |
| 8,620,836 | B2 | 12/2013 | Ghani et al. |
| 8,631,495 | B2 | 1/2014 | Judge |

(Continued)

FOREIGN PATENT DOCUMENTS

| WO | 2015006206 A1 | 1/2015 |
| WO | 2015009620 A1 | 1/2015 |

*Primary Examiner* — Christopher Brown
(74) *Attorney, Agent, or Firm* — Meunier Carlin & Curfman LLC

(57) ABSTRACT

Some aspects of the present disclosure relate to systems and methods for identifying potential violation conditions from electronic communications. In one embodiment, a method includes receiving data associated with an electronic communication and detecting, from the received data, and using a trainable model, an indicator of a potential violation condition, where the violation condition is associated with an activity that is a violation of a predetermined standard. The method also includes, responsive to detecting the indicator of the potential violation condition, marking the electronic communication as being associated with a potential violation condition, and presenting the potential violation condition to a user for review. The method also includes receiving a decision from the user, based on the review, on whether the electronic communication is associated with a violation condition, and based on the decision, improving the model for detecting potential violation conditions in other electronic communications.

30 Claims, 13 Drawing Sheets

(56) References Cited

U.S. PATENT DOCUMENTS

| | | |
|---|---|---|
| 8,768,307 B1 | 7/2014 | Heins et al. |
| 8,788,657 B2 | 7/2014 | Hodges et al. |
| 8,838,834 B2 | 9/2014 | Reynolds |
| 8,850,536 B2 | 9/2014 | Liberman et al. |
| 8,873,813 B2 | 10/2014 | Tadayon et al. |
| 8,972,511 B2 | 3/2015 | Freire et al. |
| 9,230,280 B1* | 1/2016 | Maag .................... G06Q 40/00 |
| 2008/0320010 A1* | 12/2008 | Li ...................... G06F 17/30867 |
| 2010/0205123 A1* | 8/2010 | Sculley ............... H04L 63/1408 706/12 |
| 2010/0241507 A1* | 9/2010 | Quinn .................... G06Q 30/02 705/14.42 |
| 2011/0071933 A1* | 3/2011 | Daly ...................... G06Q 40/00 705/35 |
| 2011/0261807 A1 | 10/2011 | Walters et al. |
| 2012/0143649 A1 | 6/2012 | Aubertin |
| 2014/0025372 A1 | 1/2014 | Tamura et al. |
| 2014/0136188 A1 | 5/2014 | Wroczynski et al. |
| 2014/0180728 A1 | 6/2014 | Biddle et al. |
| 2014/0283055 A1 | 9/2014 | Zahran |
| 2015/0067833 A1 | 3/2015 | Verma et al. |
| 2015/0242856 A1* | 8/2015 | Dhurandhar ........... G06Q 50/01 705/44 |

* cited by examiner

SYSTEMS AND METHODS FOR IDENTIFYING VIOLATION CONDITIONS FROM ELECTRONIC COMMUNICATIONS

BACKGROUND

The present disclosure generally relates to monitoring communications for activity that violates ethical, legal, or other standards of behavior and poses risk or harm to institutions or individuals. The need for detecting violations in the behavior of representatives of an institution has become increasingly important in the context of proactive compliance, for instance. In the modern world of financial services, there are many dangers to large institutions from a compliance perspective, and the penalties for non-compliance can be substantial, both from a monetary standpoint and in terms of reputation. Financial institutions are coming under increasing pressure to quickly identify unauthorized trading, market manipulation and unethical conduct within their organization, for example, but often lack the tools to do so effectively. For many institutions, the approach to monitoring employee and customer activity is often dependent on extensive rules-based trade and transactional monitoring. These approaches may increase the cost of compliance, as labor-intensive processes are needed in order to filter through volumes of erroneous information while trying to determine activities that pose the greatest risks to the organization. In another example context, communications such as internet personal advertisements and postings are often used in the illicit sale of sexual services and trafficking of individuals. The high volume and disparate locations, and forms of postings and the inconsistent nature of the data, poses great difficulties for law enforcement in effectively detecting criminal activity.

Thus, among other needs, there exists a need for effective identification of violation conditions from electronic communications. It is with respect to these and other considerations that the various embodiments described below are presented.

SUMMARY

Some aspects of the present disclosure relate to systems, methods, and computer-readable storage media for identifying violation conditions from electronic communications.

In one aspect, the present disclosure relates to a method which, in one embodiment, includes receiving data associated with an electronic communication and detecting, from the received data, and using a trainable model, an indicator of a potential violation condition, where a violation condition is associated with a human activity that is a violation of a predetermined standard. The method also includes, responsive to detecting the indicator of the potential violation condition, marking (i.e., flagging or otherwise noting, annotating, etc.) the electronic communication as being associated with a potential violation condition, and presenting the potential violation condition to a user for review. The method also includes receiving a decision from the user, based on the review, on whether the electronic communication is associated with a violation condition, and based on the decision, improving the model for detecting potential violation conditions in other electronic communications.

In another aspect, the present disclosure relates to a system which, in one embodiment includes one or more processors and at least one memory device storing instructions which, when executed by the one or more processors, cause the system to perform specific functions. The functions performed include receiving data associated with an electronic communication, and detecting, from the received data, and using a trainable model, an indicator of a potential violation condition, where a violation condition is associated with a human activity that is a violation of a predetermined standard. The functions performed also include, responsive to detecting the indicator of the potential violation condition, marking the electronic communication as being associated with a potential violation condition, and presenting the potential violation condition to a user for review. The functions performed also include receiving a decision from the user, based on the review, on whether the electronic communication is associated with a violation condition, and, based on the decision, improving the model for detecting potential violation conditions in other electronic communications.

In yet another aspect, the present disclosure relates to a non-transitory computer-readable medium storing instructions which, when executed by one or more processors, cause a computing device to perform specific functions. The functions performed include receiving data associated with an electronic communication, and detecting, from the received data, and using a trainable model, an indicator of a potential violation condition, where a violation condition is associated with a human activity that is a violation of a predetermined standard. The functions performed also include, responsive to detecting the indicator of the potential violation condition, marking the electronic communication as being associated with a potential violation condition, and presenting the potential violation condition to a user for review. The functions performed also include receiving a decision from the user, based on the review, on whether the electronic communication is associated with a violation condition, and, based on the decision, improving the model for detecting potential violation conditions in other electronic communications.

BRIEF DESCRIPTION OF THE DRAWINGS

Reference will now be made to the accompanying drawings, which are not necessarily drawn to scale.

FIG. 4 illustrates an example of an escalation queue in accordance with one embodiment, with a queue of messages that have been flagged as potentially being indicative of a violation condition and which are pending further review.

FIG. 6 illustrates a user interface in accordance with one embodiment used in monitoring for illegal activity, with a prioritized list of advertisements and showing key indicators (KIs) for each.

DETAILED DESCRIPTION

Figure 1A:
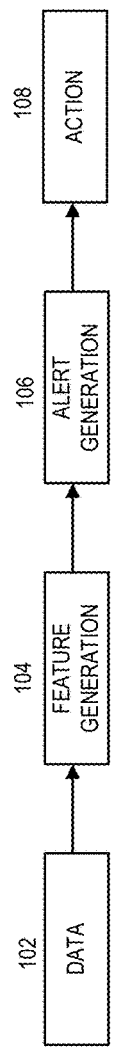
FIGS. 1A and 1B illustrate an overview of a process for identifying violation conditions from electronic communications, in accordance with some embodiments.

The following detailed description is directed to systems, methods, and computer-readable media for identifying violation conditions from electronic communications.

Although example embodiments of the present disclosure are explained in detail, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Moreover, titles or subtitles may be used in this specification for the convenience of a reader, which shall have no influence on the scope of the present disclosure.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose.

It is to be understood that the mention of one or more steps of a method does not preclude the presence of additional method steps or intervening method steps between those steps expressly identified. Steps of a method may be performed in a different order than those described herein. Similarly, it is also to be understood that the mention of one or more components in a device or system does not preclude the presence of additional components or intervening components between those components expressly identified.

In the following detailed description, references are made to the accompanying drawings that form a part hereof and that show, by way of illustration, specific embodiments or examples. In referring to the drawings, like numerals represent like elements throughout the several figures.

In accordance with some embodiments, through the use of both supervised and unsupervised methods, specific focus can be placed on the efficacy of a user decision, where a feedback loop may have two starting points: example messages with known decisions for those messages; and, known patterns and/or features indicative of particular set of circumstances requiring follow-up. With either starting point, the processes involved in one cycle of the loop may comprise ingesting new (and not previously reviewed) samples, decomposing these samples into their constituent features, and applying a set of algorithms to arrive at a decision. That decision can then be presented to a human reviewer to take action, for example to discard, escalate, or confirm, as will be described in further detail below. A system in accordance with some embodiments of the disclosed technology can take in certain data based on the decision-based user actions and then review, update, and improve the original algorithm(s). The human review process can be utilized to determine not only true positives and true negatives, but also to determine the relative degree of positive or negative (high weighting, low weighting, etc.).

In some embodiments, supervised and/or unsupervised machine learning can be used for improving the efficacy (precision, recall, etc.), by adjusting the selection and weighting of patterns and/or features, and adjusting thresholds for alerting. Under supervised learning (see, e.g., FIG. 10), human users may provide communications with examples of violation conditions (e.g., emails with instances of bribery or insider trading) and a system can learn to identify similar messages based on underlying patterns or features. According to some embodiments, in unsupervised (or passive, background) learning, a system can automatically adjust the selection and weighting of features or patterns as well as alerting thresholds, based on the actions/decisions by the human user. For example, if an alert is determined repeatedly to be a false indication (also referred to herein as a "false positive"), the system can learn to then 1) not use one or more particular patterns or features in the future, 2) reduce the weighting of one or more patterns or features, 3) suggest new, more effective patterns or features, and/or 4) adjust the threshold for triggering an alert (or any combination of these).

Figure 1B:
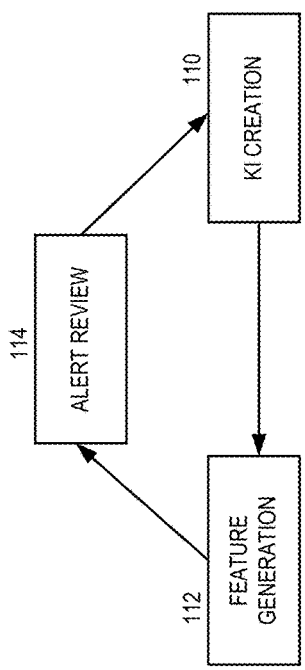

FIGS. 1A and 1B illustrate aspects of identifying potential violation conditions from electronic communications in accordance with some embodiments. The various components shown in these Figures and their associated functionalities can enable one or more systems to understand and analyze disparate data, persist and update results, and interact with an application that can both access the results and provide feedback to improve the performance of the algorithm(s) used. According to some embodiments, electronic communication data 102 is first ingested. Electronic communication data and "electronic communications" as used herein can include, but is not limited to, email, IM chat, social media messages, text messages, and electronic advertisements or other Internet-based postings, and may include structured and/or unstructured data. Once the data 102 has been ingested, its content may be specifically analyzed using, for example, various NLP processes that provide the ability to extract entities, relationships, facts, and other important pieces of information that may be leveraged in alert generation 106. Analysis of the ingested data can include one or more of document classification, region classification, entity extraction, and categorization, fact generation and classification and/or metadata analysis, among other forms of analysis. In some embodiments, each of a plurality of documents (i.e., collection of text) or other messages may be checked for every defined pattern and saved.

Once pattern recognition and certain analysis has taken place, certain patterns and features can be generated (see "Feature Generation" 104 in FIG. 1A and "Feature Generation" 112 in FIG. 1B). In some embodiments, a user is able to define unique and meaningful combinations of features that will generate alerts, thereby allowing the user to further form pattern recognition and build behavior definitions that exhibit risk related behavior, such as key indicators (KIs) (see, e.g., "KI Creation" 110 in FIG. 1B). In some embodiments, a user can select predetermined KIs to be identified, and in some embodiments, a user can specify and generate KIs and/or features to be applied to the electronic communications during NLP analysis and can specify an initial weighting to be given to a newly created KI. After definitions have been input by a user or more data has been ingested, in some embodiments, all electronic communications having criteria described in a KI definition can be located, and alerts can be raised for those messages (see, e.g., "Alert Generation" 106 in FIG. 1A). That is, in some embodiments, alerts can be generated in response to data containing one or more KIs. An alert can indicate a real world, actionable item to be considered for review.

For an electronic communication that generates an alert, the electronic communication, or relevant parts of it, can be presented to a user for review (see "Action" 108 in FIG. 1A and "Alert Review" 114 in FIG. 1B). The user (such as an analyst, compliance officer, law enforcement officer, etc.) can review the message and make a determination as to whether it requires further review (i.e., whether it appears to represent a violation condition) or whether no further review is required (i.e., that it does not indicate the presence of a violation condition). In some embodiments, an analytic engine can learn from the input received from the user by, in response to receiving user input for their review of the message, refining the algorithms used to flag or assign a risk score to a communication to make it more accurate. In this way, an ever-evolving feedback loop is realized, that can make more accurate determinations regarding the existence of violation conditions as more data points are acquired for reference.

According to some embodiments, during a data ingestion stage, data can be received, pre-processed, and converted into a predetermined format. For example, in some embodiments, all textual content can be transformed into a proprietary normalized input format. Metadata associated with the ingested files, such as, but not limited to, sender/recipient, time stamps, domains and mail servers, can be extracted for future cross-reference with the unstructured content of the ingested files. During preprocessing, documents that are difficult or impossible to parse with a NLP engine can be removed. Once preprocessing is complete, an ingestion engine or other component can identify which file format has been detected, and process accordingly. In some embodiments, a system can ingest website extracts provided by a web scraper, which can ensure the correct mapping of the unstructured data, along with any associated structured metadata, into an XML format. The system can parse, store, and associate all metadata along with the results of an NLP analysis and other analytics (e.g., various "Advanced Analytics" functions as will be described later, for instance with respect to FIG. 11) to enable searching, filtering, and sorting of information.

According to some embodiments, data considered to be irrelevant or "noise" may be filtered out prior to analysis. Noisy data in electronic communications such as email or chat data may skew results of what could otherwise be a clear and concise analysis. Examples of noisy data may include spam email, internal newswire data, human resource announcements, and other various auto-generated or widely distributed content. To filter out the noisy data, for example in the case of emails, emails may be filtered using a sender/receiver filter list. In some embodiments, it may be detected whether a user is forwarding an irrelevant email, such as a spam email, to a colleague and may filter out the forwarded email.

In some embodiments, a document classifier may be used to perform an in depth analysis of the content of a communication to determine whether or not it should be filtered. In some embodiments, the performance and/or accuracy of the document classifier may be improved through training. Further, in some embodiments, the system may ignore text template regions of documents when performing an analysis. A text template region may be boiler plate language that is appended to documents, for example disclaimer text that is automatically appended to the end of an email. In some embodiments, the system may have or receive as user input a list of known text template regions to ignore. In some embodiments, a system may utilize a region classifier which may identify text template regions through training.

After data has been ingested and noisy data has been filtered out, the data can then be specifically analyzed. In some embodiments, each message that has not been explicitly excluded can have a complete analysis conducted, which may include document classification, region classification, entity extraction and categorization, fact generation and classification, and/or metadata analysis. In some embodiments, each document may be checked for every defined pattern and saved.

In some embodiments, one or more advanced NLP algorithms can be run on the ingested data for the purpose of identifying any potential violation conditions. A violation condition can represent a situation or circumstance involving people who are engaging in illegal, unethical, or otherwise undesirable activities violating predetermined standards of behavior. The activities associated with the violation conditions may pose risk or harm to institutions or individuals. For example, in the context of corporate governance, a violation condition may be a situation where one or more people are engaging, or conspiring to engage, in insider trading or money laundering. In the context of internet based sex trafficking, a violation condition can be a situation where a minor is offering sexual services in exchange for money. Because some embodiments of the disclosed technology can be applied in a multitude of situations and environments to detect undesirable behavior, a violation condition can be defined as any number of different situations or behaviors, depending on the context and/or the objectives.

Violation conditions can be detected by identifying specified indicators such as KIs. KIs can be a set of characteristics that represent the likelihood of a particular behavior. As examples, in the corporate governance context, KIs may be associated with rumor dissemination, insider trading/information, or improper distribution of confidential documents. In the context of illegal sexual services, KIs may be associated with indications that an individual is under control by another individual or is underage. Different KIs can be specified for different use cases or contexts. According to some embodiments, a user can select or input KIs to be identified.

In some embodiments, KIs may be comprised of a collection of patterns. The patterns may be unique attributes that a piece of information may contain, and may be discerned using, for example, NLP based language detection and/or metadata analysis. According to some embodiments, while the existence of a single pattern alone may not indicate suspicious activity (i.e., a potential violation condition), the detection of a combination of patterns may indicate suspicious activity. In some embodiments, upon detecting a combination of patterns indicative of a potential violation condition, the system may output an alert to a user to investigate the activity.

Figure 2:
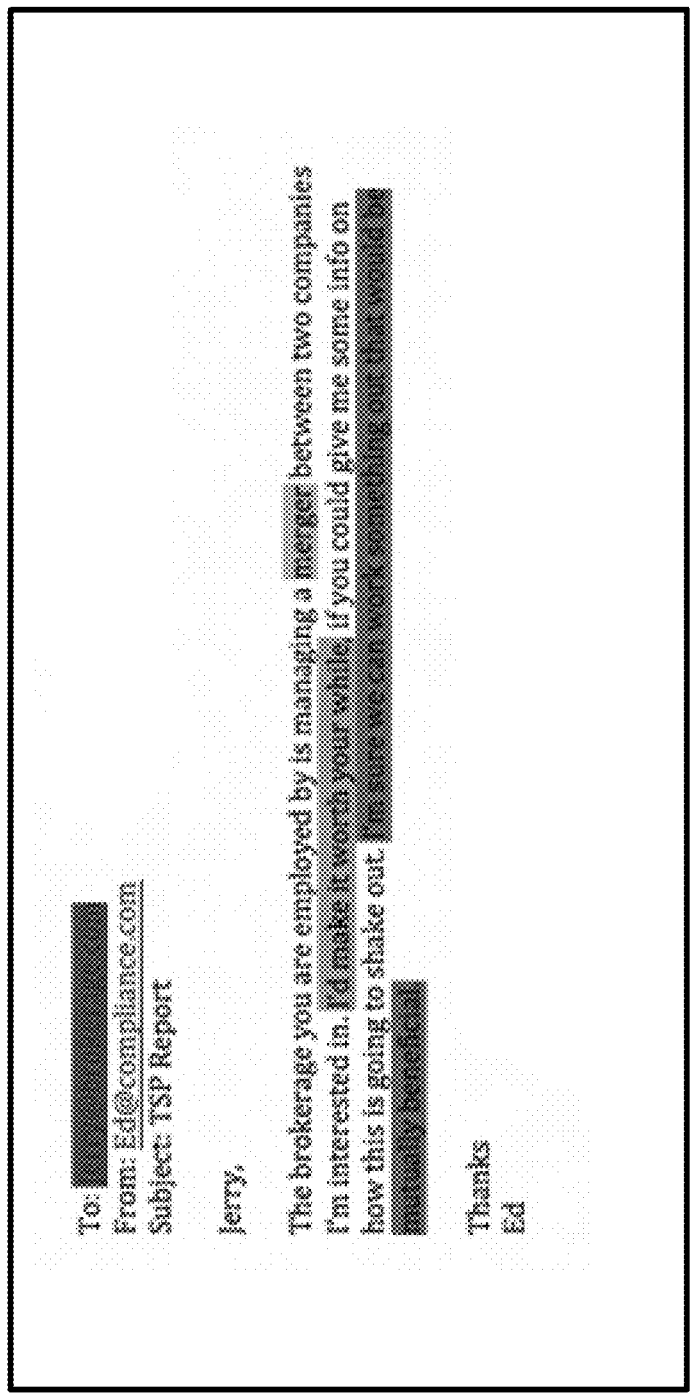
FIG. 2 illustrates an example of an electronic communication with various features and key indicators (KIs).

In some embodiments, systems can be used to identify behavioral characteristics, which may be referred to herein as features, that in isolation may be irrelevant, but together may be relevant to identifying a violation condition. FIG. 2 illustrates an example of the features and KIs in an example email. Examples of features shown in the email of FIG. 2 are highlighted and include "jerry@brokerage.com", "merger", and "I'll make it worth your while." A KI may have many associated features. For example, a KI may be the combination of 1) the "merger" language, 2) the fact that the recipient of the message is associated with a brokerage, and 3) the language "I'd make it worth your while". Other examples of features in other embodiments (which could together form KIs) may be that an email was sent after a particular time of day, that an email had less than a certain number of recipients, or that an email includes a business name.

According to some embodiments, communications can be flagged/marked as having or representing potential violation conditions, and each flagged communication may be assigned a risk score. A risk score can represent an approximation (numerical value, probability, etc.) of the likelihood that the flagged communication represents a true violation condition (e.g., likelihood that a particular email truly does indicate an intent to commit insider trading). Scoring and/or weighting may involve setting or adjusting, training, etc. an underlying model for when a certain classification will trigger a KI. For example, in the context of illegal sexual services involving minors, a "maturity" score (a risk score) may be associated with a person potentially underage and illegally involved in prostitution or trafficking, where a prediction for a maturity score may be made based on a scale, such as from −1 to 1, where −1 is strongly indicative of immaturity (i.e., underage). If, for example, a particular advertisement or other message or collection of electronic communication information is classified (by the model or by a supervising user, etc.) as being indicative of a low maturity score (i.e., high immaturity score, likely that a person is underage) by an associated score near −1, for example −0.75, then making a decision to alert a user may only be done at a −0.75 or lower. There can be a threshold score for triggering the recognition of a KI, and/or for generating and sending an alert to a user for review. An alert to a user for further review of the communication may be triggered if the risk score meets or exceeds a predetermined threshold level or value, which may be set by a user.

As described in some detail above, and as will be discussed further with respect to FIGS. 11 and 12, according to some embodiments, the analytics stage of the process shown in FIGS. 1A and 1B can involve processing and analyzing raw human communication in the form of electronic communications such as email, IM chat, social media messages, and text messages along with the associated metadata and converting into a structured query-ready format. For example, in some embodiments, the raw input data can be converted into a form of XML and NLP analytics functions are performed. According to some embodiments, a multi-stage NLP process can be used to break text into foundational building blocks in order to decompose unstructured data (e.g., natural language text) into entities, relationships, and associations. In some embodiments, the NLP process can include determining sentence boundaries and breaking up the text into "tokens." A token can be a word or a punctuation. Each token can be analyzed and assigned a grammatical Part of Speech (POS) tag. Chunks of text can be analyzed to determine if they belong to one of the categories predefined by a system (e.g., people, organizations, business, vehicle, etc.). Other analytic functions may be implemented using this foundation, for example identifying and cataloging significant activities (or assertions) between entities. In some embodiments, these assertions can then be categorized to describe specific types of activities, such as communications activities, purchase/acquisition activities, etc. NLP can be used to extract and identify key syntactic and semantic features present in the text, such as locations, phone numbers, URLs, names, ages, and "tone."

As will be described in further detail below with respect to FIGS. 11 and 12, in some embodiments, as data is being analyzed and processed, a Knowledge Graph representation of the information can be built, which can be a representation of the entities and relationships that are present in the data. During the construction and curation of a KG, in some embodiments, alerts may be generated when predefined behaviors (e.g., KIs) are exhibited. KIs may be comprised of a collection of patterns. Embodiments of the disclosed technology support a wide variety of definable patterns, including NLP based language detection and document metadata analysis. In some embodiments, NLP analytics can be performed in two phases: Local Analytics and Global Analytics (sometimes also referred to herein as "Advanced Analytics"). Local Analytics can include grammatical decomposition, parts-of-speech tagging, entity extraction, grammatical structure and syntax analysis, and other such analyses performed on each individual electronic communication file. Lexicons and/or reference lists of, for example, companies or people of interest, can be incorporated into the analysis. In some embodiments, the Global Analytics phase can involve comparing the output of each individual file to a wider corpus for corpus-wide entity identification. For example, this can allow a system to understand that "my boss" in the context of a subordinate's email is referring to the same person as "the CEO of XYZ Corporation" in someone else's email. The output of the ingestion phase and the combined Local and Global Analytics can be a structured database. In one embodiment, the output can be a structured database in HBase that can be accessed in various ways. For example, a Hadoop job can be read from HBase directly, or Hive/Impala can be used to query data using an SQL-like query language.

In some embodiments, various established methodologies can be incorporated to reduce false hits and enhance the precision of flagged potential true positives as part of the analytics process. For example, through the NLP process, KI-specific context analysis can be performed to identify language indicative of a potential violation condition. In the context of corporate governance, for instance, a discussion of executive position changes, "personal" language (i.e., "keep this between us"), source references (e.g., "just heard from . . . ") and non-permissible communication with corporate insiders can be indications of a potential violation condition. In some embodiments, lists of internal and external entities can be incorporated to help identify potentially inappropriate communications and relationships.

In some embodiments, various components, or layers, of communication from each message may be analyzed. These layers can be domain, audience, content and/or tone. When examining the domains/audience layer, a system can: identify and classify as irrelevant generic circular communications distributed automatically; identify messages distributed to a relatively large audience (i.e., >n recipients); extract the name of a sender/recipient and identify the domain of the messages (i.e., personal vs. business) and cross reference the type of domain if pertaining to a business (e.g., bank vs. hedge fund vs. corporate issuer); and, identify senders/recipients as senior executives or IR representatives (indicative of non-suspicious activity) versus other company insiders (which may be indicative of suspicious activity).

When examining the content layer, in some embodiments a system can identify references to legal entities of interest in the context of corporate actions language (e.g., M&A, funding events), place individuals of interest (e.g., senior corporate executives) in the context of significant management changes or as sources of confidential information, and identify any other content potentially resulting in an actionable trading signal. When examining the tone layer, a system can assess relevant content in the context of origin of information, such as information conveyed by a sender/recipient but sourced from a third party, information shared in confidence or quid pro quo language, and identify relevant content in a context highly indicative of rumor dissemination, speculation, or a trading tip.

According to some embodiments, once a communication has been flagged and has been assigned a risk score, the system can present the communication to a user for review. The user can review the communication and make a determination as to whether it requires further review (i.e., whether it appears to represent a violation condition) or whether no further review is required (i.e., that it does not indicate the presence of a violation condition). In some embodiments, an indication is received from the user of whether the flagged communication requires further review. An analytic engine of a system can learn from the input received from the user by, in response to receiving the user input, refining the algorithms used to flag and/or assign a risk score to a communication in order to make it more accurate. In this way, the system provides for an ever-evolving feedback loop that can make more accurate determinations regarding the existence of violation conditions as the system acquires more data points for reference. After a number of iterations, the weighting (e.g., numerical or relative value) assigned to each feature and/or KI can be refined to generate an optimal ratio of Potential True Positives (PTPs) to False Positives (FP). A PTP can be a case where a system has correctly identified a document or situation that indicates a possible violation condition, whereas a FP can be a case where the system has incorrectly identified a document or situation that indicates a possible violation condition.

Figure 3:
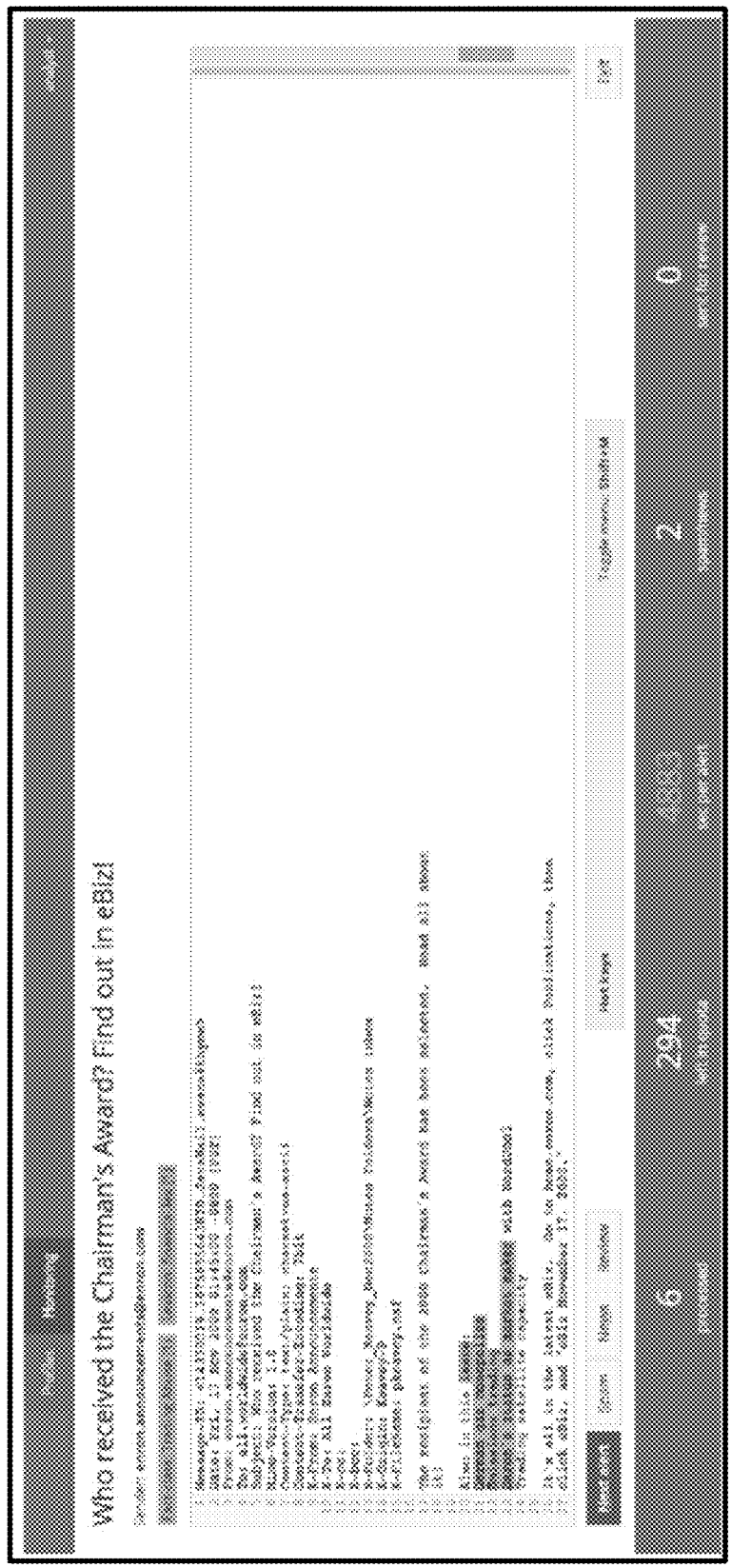
FIG. 3 illustrates an example of a triage queue interface in accordance with one embodiment that may present a user with message content that has raised an alert.

Systems in accordance with some embodiments may include various user interfaces to allow users to review alerts, input data related to an alert, and flag or escalate an alert for further review. For example, FIG. 3 shows an example embodiment of a triage queue interface that may present a user, such as an analyst, with message content that has raised an alert, such as a system generated alert. In some embodiments, any patterns that are present within the text of the message content may be highlighted. In the example of FIG. 3, the message content raising alerts contains the highlighted language "issue", "German gas monopolies", "Emissions trading", and "Enron's status as a market maker". A user may review the message content and a system may receive user inputs, such as an indication that the message is spam, an indication that the message is not indicative of a violation condition, an indication that the message is indicative of a violation condition, and/or notations. According to some embodiments, an indication may be received from a user that the message may be indicative of a violation condition, and then the system may escalate the message to an escalation queue.

Figure 4:
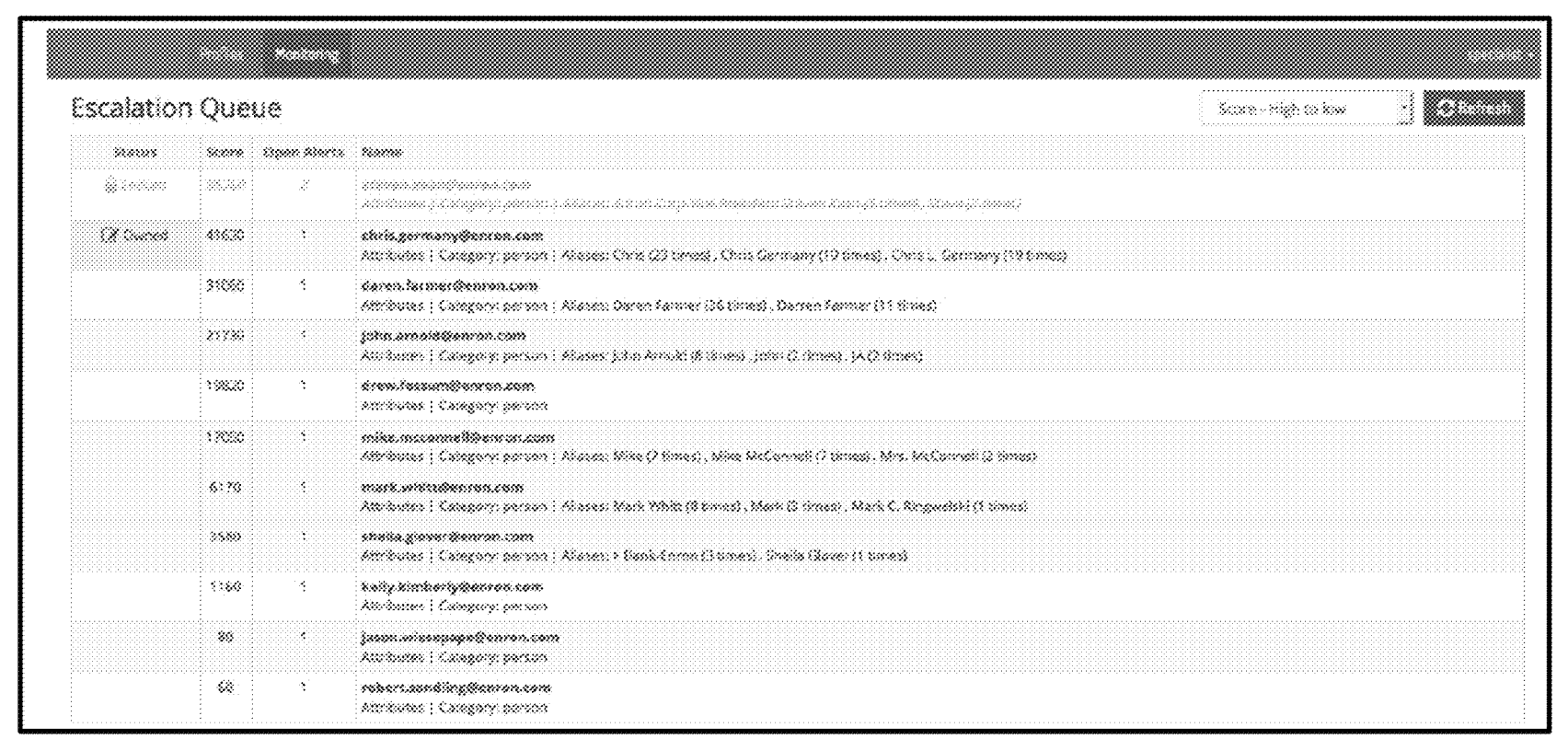

FIG. 4 shows an example embodiment of an escalation queue. An escalation queue may be a queue of messages that have been flagged as potentially being indicative of a violation condition and that are pending further review. The escalation queue may group all pending alerts related to a particular person. In some embodiments, the escalation queue may associate a risk score with each person. In some embodiments, a user may be enabled to view a given person's profile by, for example, clicking on their name. A person's profile (see, e.g., FIG. 8) may contain reference data, facts about the person, and a view of all of the relationships of the person to other people and entities. The person's profile may assist a user in reviewing and making a decision about a particular alert that relates to that person. Upon reviewing an alert in the escalation queue, a user may either accept or reject the alert. According to some embodiments, if an indication of a rejection of the alert is received from a user, the alert may be discarded. In some embodiments, an indication of an acceptance of an alert is received from a user, a system may escalate the alert further to the status of a raised alert. In some embodiments, upon being escalated to a raised alert, a system may notify a specified person of authority, for example, the general counsel of the company, of the raised alert.

Figure 10:
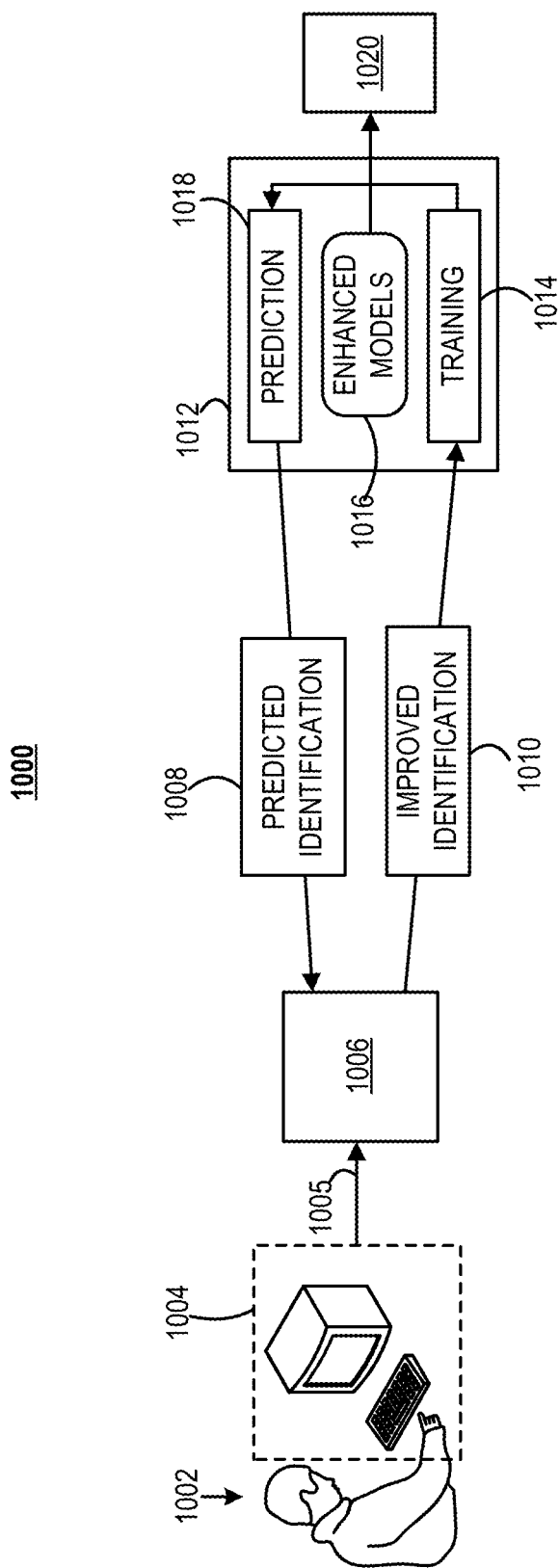
FIG. 10 illustrates a system for machine learning capable of implementing one or more embodiments.

As described in some detail above, and as shown in FIG. 10 and described in the corresponding discussion, various aspects of the present disclosure in accordance with some embodiments can be implemented using model-based machine learning techniques which can leverage human and computer interaction to identify the features that correctly perform the analytics to generate the proper results. As described in some detail above, according to some embodiments the training can be "directed" or "passive." In the case of "directed" training, training is accomplished by passing human annotated data to the machine-learning training algorithm which can create the appropriate model. According to some embodiments, the system can provide an annotation interface to assist with this process. In the case of "passive" learning, training can be accomplished by collecting human analyst interactions with the system and then using that data to improve the model.

Some embodiments can generate alerts in response to data records (e.g., emails) containing one or more specified KIs. An alert can indicate a real world, actionable item to be considered for review. Records that are associated with alerts can be analyzed, discarded, or flagged for further review. A user interface can allow a user to view records (e.g., emails, advertisements, etc.) and provide input as to whether or not the record is indicative of a violation condition. In some embodiments, a user can specify what violation condition the record is indicative of, and/or an indication of how confident the user is in the determination of the existence of the violation condition in relation to the record (e.g., numerical value, probability, etc.). In some embodiments, a user interface can enable a user to specify and generate KIs and/or features to be applied to the records during NLP analysis and can allow the user to specify an initial weighting (relative measure of importance, for instance) to be given to a newly created KI.

In some embodiments, the user interface may provide a variety of filters and search functionalities that can provide records meeting a specified criteria (e.g., search by KI, keyword search in text, search by sender/recipient, etc.) for review. Each record can have a "status" associated with it that can indicate, for example, whether the record has been flagged for further review. In some embodiments, a system can maintain an action pending queue of records that have been assigned a particular status, but have not been marked as resolved. Generally speaking, a user interface in accordance with one or more embodiments can be designed to have a number of different functionalities that facilitate the review and classification of records by a user. Although many embodiments may utilize similar underlying principals, methods, and components, different embodiments may provide different user interfaces based on the context.

Figure 7:
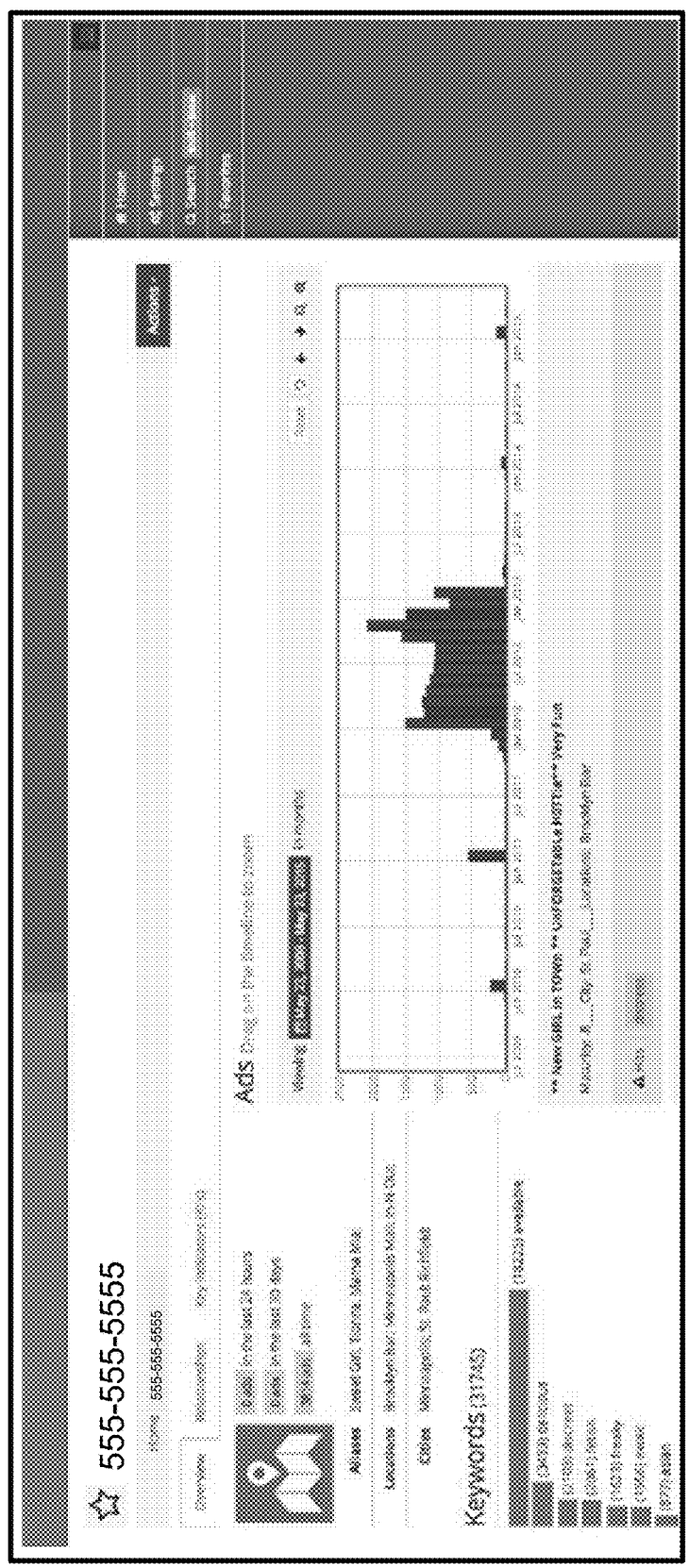
FIG. 7 illustrates a user interface according to one embodiment, showing aggregated information related to a particular individual's various advertisements.

Example implementations of various embodiments of the present disclosure will now be described in the context of monitoring illegal services, and with reference to FIGS. 5-7. Some embodiments provide systems and methods for identifying victims of domestic minor sex trafficking. Data ingestion can begin by scraping data from the internet, intelligently processing that data, and presenting the data to a user for further review. The internet data can be scraped on an ongoing basis from web-based escort service sites and prostitution boards (see information collected and shown in FIG. 5). Once ingested, the data is processed and run through NLP algorithms to identify likely child victims within escort services environments. This step can include assigning an underage likelihood score to each ad posted. A user interface can allow a user, such as a regional law enforcement officer, to search their regions for all ads, for specific phone numbers, to track specific phone numbers as they move around the country, and to detect patterns and trends over time. Some embodiments utilize natural language processing to extract and identify key syntactic and semantic features present in the text (see, e.g., "Ad Text" section in FIG. 5). For example, locations, phone numbers, URLs, names, ages, and "tone" can be extracted to support downstream analytics.

In various Advanced Analytics functions according to some embodiments, reasoning functions performed on ingested data for NLP include entity resolution (also referred to as "coreference resolution"), geographical (geo) reasoning functions, and temporal reasoning functions. Entity resolution can involve finding and rolling up all the elements in both structured and unstructured data that define the same entity into a virtual global entity, which can be considered as a maximally determined set of properties across a collection of structured and unstructured elements. Geographical reasoning (geo-reasoning) functions can identify and tag named locations found in the text with their respective geo-coordinates (i.e., longitude and latitude). These values can be stored in the data as properties belonging to the element representing the names location. These processes can be performed during unstructured data ingestion processing. Temporal reasoning functions can identify specific and relative references to time/date specifications, allowing elements to be ground in time and space. Relative time/data references can be resolved whenever sufficient data is present. For example, if a document contains a date reference to what is being described in the text, and a reference is made to "tomorrow", then that time reference can be resolved to date for the day following the specific date reference.

The above-mentioned Advanced Analytics reasoning functions can be utilized to provide the following capabilities in monitoring illegal sexual services: mapping phone number activity by geography; executing real-time searches of escort pages for minor ads by geography; viewing escort page ad search results on a map; viewing phone number analytics from an escort ad (geography, historical analysis, photos attached, associated ads, etc.); identifying escort page ads likely to be for minors, based on text; and displaying ads in order of priority based on an immaturity score. As mentioned above, some embodiments of the present disclosure can be utilized in model based machine learning. In some embodiments, directed training (based on human annotated data passed to machine learning training algorithms to create appropriate models) is used to build models to parse web scrapes and identify entities of interest (URLs, phone numbers, etc.). Passive learning (training by collecting analyst interactions with a system and using the data to improve a model) can be used to capture a user's triaging of ads through a user interface. For example, when an analyst such as a law enforcement officer qualifies or disqualifies ads as relevant or non-relevant, this information can be collected and used to improve the algorithms, leading to better predictions going forward.

Figure 5:
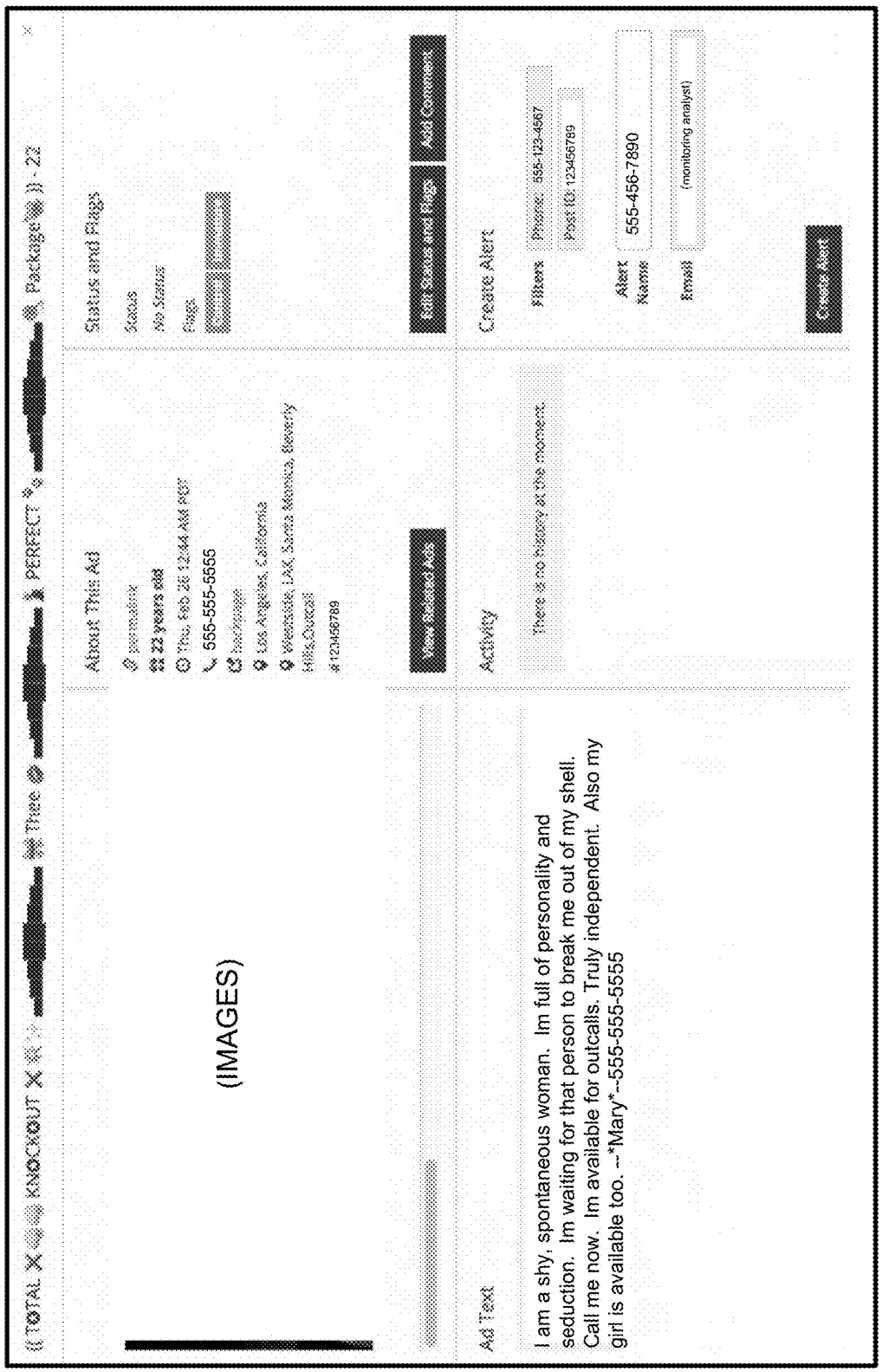
FIG. 5 illustrates a user interface in accordance with one embodiment showing information of a personal advertisement.
Figure 6:
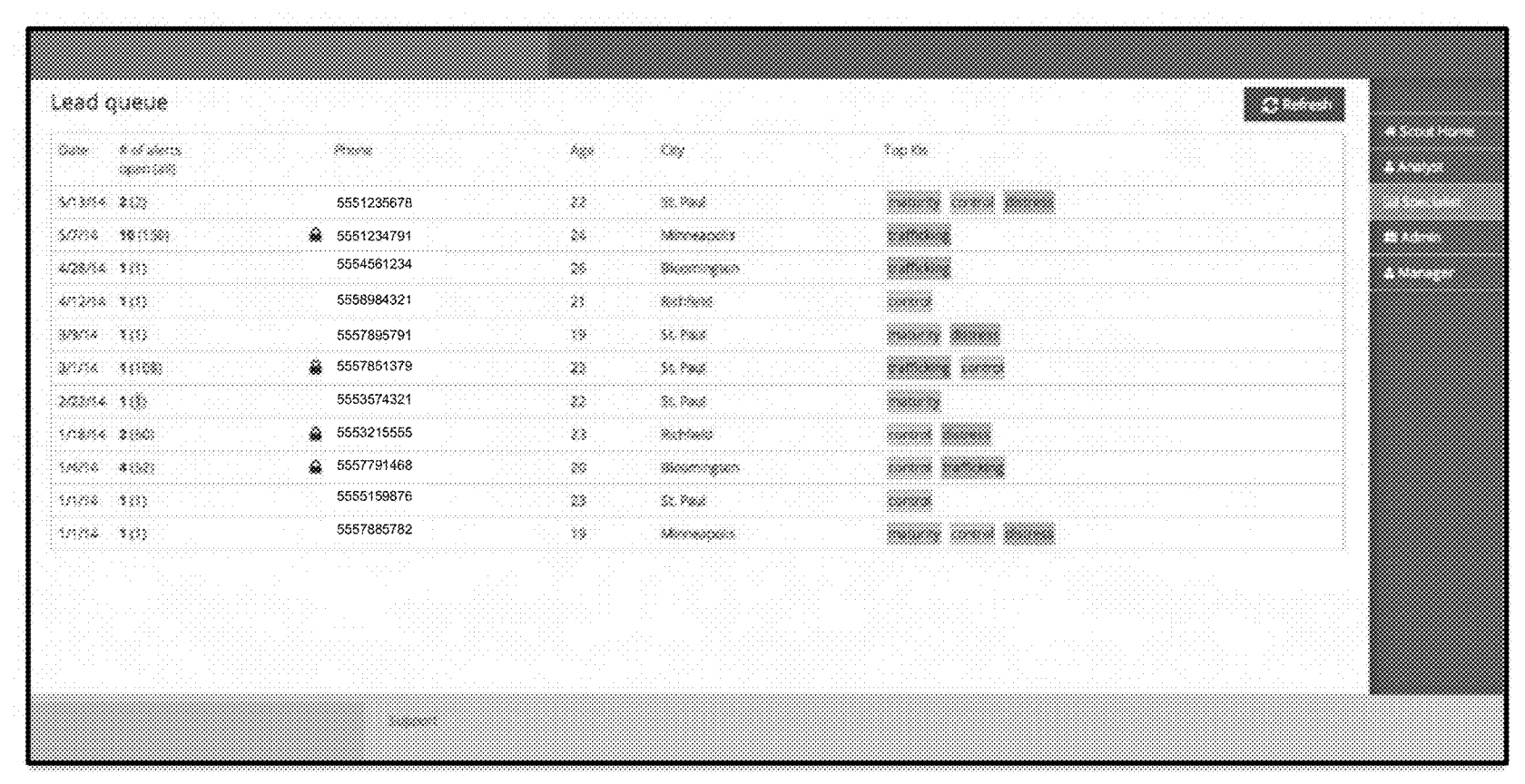

In the context of monitoring for advertisements of illegal sexual services, one or more embodiments can utilize user interfaces like those shown in FIGS. 5 and 6. The user interface shown in FIG. 6 can present a list of advertisements prioritized based on the results of a system analysis or by filtering metadata such as geography and/or source. In some embodiments, the user interface can suggest which alerts a user should review and prompt a user to provide the necessary feedback. For example, a user can provide an indication of whether a particular advertisement does or does not present a likely probability of a violation condition, such as the presence of a likely sex-trafficking victim in an advertisement. As described above, a system can utilize such user feedback to improve and refine the algorithms of the system in order to generate more accurate results in the future. Although not shown specifically in the Figures, in some embodiments, further user interfaces can utilize photo analysis of photos posted in an advertisement (e.g., personal photos that would appear in the "(IMAGES")" section of the ad information shown in the interface of FIG. 5) as KIs, and alerts may be set to be sent to users (via email, text, etc.) based on thresholds set based on maturity/immaturity score, photo analysis, etc.

In some embodiments, for example in FIG. 6, a user interface can provide a list of records to be reviewed by a user, wherein each record is associated with one or more KIs that have been identified (see right side: "maturity", "control", "distress", "trafficking"). The KIs can be displayed as part of the listing of a record so that a user can quickly appreciate what potential violation condition the record has been flagged for. According to some embodiments, records can be sorted and displayed by selection of a particular KI.

Figure 8:
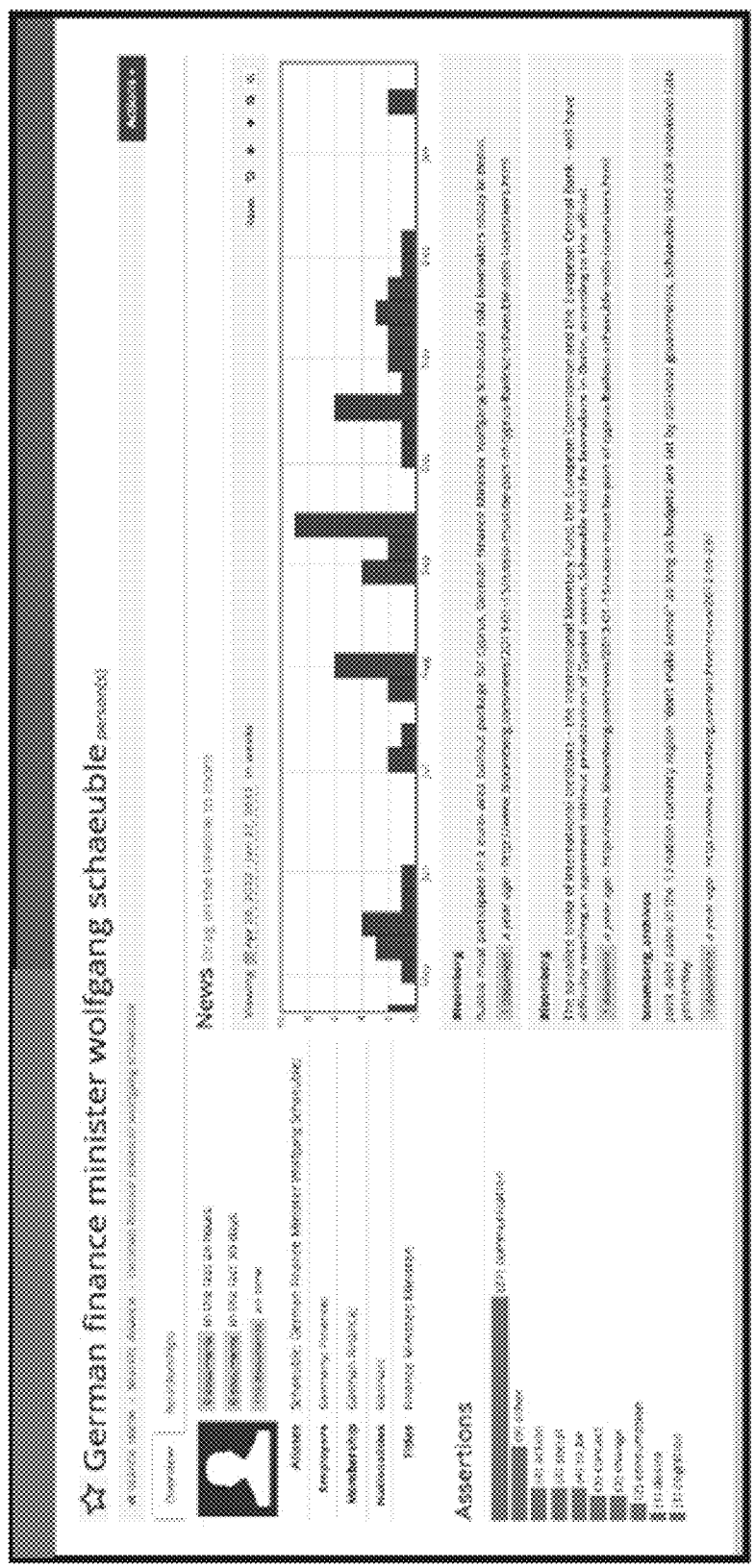
FIG. 8 illustrates a user interface according to one embodiment, displaying aggregated information on a particular businessperson.

In some embodiments, a system can aggregate related records together and present them in a single profile. For example, in the context of monitoring of sex trafficking websites, the system can aggregate all of the advertisements from a particular person, based on the phone number associated with the advertisement or the photos associated with the advertisement. Example embodiments of user interfaces displaying such aggregated content are shown in FIGS. 7 and 8. FIG. 7 shows an example of aggregated content related to a particular individual's various advertisements for sexual services. A system according to some embodiments can aggregate the information related to this individual so that the user interface can display the various aliases of the individual, locations, cities, keywords, relationships, KIs, and a timeline of activity. Similarly, FIG. 8 shows a user interface displaying aggregated content on a particular businessman. Such user interfaces can allow a user to quickly identify previously hidden trends, relationships, and activities of the target individual or organization.

Further aspects of the present disclosure relating to KIs will now be described in further detail. According to some embodiments, KIs may include a plurality of patterns. For example a KI may contain a first pattern of "gift language" and a second pattern of "email to a client" that may be used together to identify emails sent to clients containing gift language, which may represent a potential violation condition. In some embodiments, a system may use simple lexicon patterns to identify patterns in documents. A simple lexicon pattern may be a word or a list of words. Accordingly, when identifying a lexicon pattern, the system may analyze a message or data to find an exact match to a word or string of characters. A complex lexicon pattern may be string of characters, a word, or a set of words that are close to the string of characters, word, or set of words being sought to be identified. A complex lexicon pattern may include, for example, wild card characters, distance specifications, and word sets.

In some embodiments, categorized lexicon patterns may be used to identify patterns in documents. A categorized lexicon pattern may be identified if a particular entity is present within a particular context. In some embodiments, a categorized lexicon pattern may include a business name used in a business context. For example, "Apple" is a business name, but the word "apple" may not always be used as a business name, and so a categorized lexicon pattern may be used to identify only instances of the business name Apple and the system may achieve this by analyzing the context of the instance of the word "apple" to determine if it is indicative of a business. Accordingly, it may be determined, for example, that the phrase "I'm working on a merger for Apple" meets the pattern, because it may recognize the context (i.e., discussion of a merger) indicates a business situation. Likewise, the system may determine, for example, that the phrase "I brought an apple for lunch" does not meet the pattern because the context does not indicate a business situation.

In some embodiments, a system may use fact classification patterns to identify patterns in documents. A "fact" in this context may represent a subject/predicate/object triple that represents a single piece of information, which may have been extracted from unstructured text. For example, "John Brown owns Acme Finance" may be considered a fact, where "John Brown" is the subject, "owns" is the predicate, and "Acme Finance" is the object. According to some embodiments, upon identifying a fact, the system may additionally categorize the entities within the fact and stem the verb if possible. For example, "John Brown" may be categorized as a person, "Acme Finance" may be categorized as a business, and "own" may be determined to be the predicate stem of "owns." According to some embodiments, with knowledge of the entities present, the categories the entities fall in, and how the entities are related, a common format may exist upon which rules can be applied for classification. For example, the following table provides example embodiments of some rules that may be generated using an example format:

| Classification Id | Classification Name | Subject Category | Object Category | Subject Lexicon | Object Lexicon | Predicate Lexicon |
|---|---|---|---|---|---|---|
| FC-1 | Individual Ownership of a Business | PERSON | BUSINESS | ~ | ~ | ownership_verbs |
| FC-2 | Trade Language | PERSON | BUSINESS | ~ | ~ | trade_verbs |
| FC-2 | Trade Language | BUSINESS | BUSINESS | ~ | ~ | trade_verbs |
| FC-3 | Restricted Trade Facts | ~ | BUSINESS | ~ | ~ | restricted_businesses |

As shown by this example, in some embodiments there can be more than one rule defined to classify a particular fact. For example, in this case there are two rules for "trade language." As shown in this example, a fact categorization pattern may include a "subject lexicon" or an "object lexicon" that may allow the rule to identify patterns involving specified subjects or objects. In some embodiments, the subject lexicon or object lexicon may also act as "stand-in" for a subject or object category if no subject or object category is specified. Embodiments using fact categorization patterns may also utilize a lexicon in combination with the patterns. For example, if a sentence says "I am working at GC" and "GC" has been determined to be a reference to "Gold Company", and "Gold Company" is in the lexicon, then "I am working at GC" may be determined to meet the specified pattern. Furthermore, in some embodiments, predicate lexicons may be matched against both the predicate stems and the predicate text.

In some embodiments, document classification patterns may be used to identify patterns in documents. According to some embodiments, a document classification pattern may utilize components of NLP in conjunction with one or more of the aforementioned patterns described above to read and understand a document in its entirety and make a determination about whether it is part of a large class of documents. For example, using document classification patterns, the system may look at an entire document and determine whether the document is spam. According to some embodiments, a document classifier may be created from a sample set of documents that have been marked as either positive or negative examples of the type of document that is being classified, and then a system may apply machine learning algorithms to generate a probabilistic model that can be applied to any previously unknown document and provide a decision and a confidence level regarding whether the unknown document is a part of that class.

In some embodiments, the system may use region classification patterns to identify patterns in documents. Region classification is similar to document classification, but region classification typically operates at the sentence level, which may provide more targeted ability to not only detect the pattern, but also detect which sentences or other segments within a document exhibit the pattern. An example of a region classification pattern can be illustrated with respect to the following text of an email:

Dear Harry,
  I was really pleased to hear about your promotion to MD.
    Let's go have some drinks. On another note, we need to talk about getting some more trades booked by 4 PM. We don't want to miss this chance.

George

A region classifier for "gifts and entertainment" may determine that the phrase "Let's go have some drinks" is for gifts and entertainment, due to the use of first person plural pronoun, a possessive present or future tense verb and the object being classified as an entertainment item. Further, the region classifier may determine that the phrase "we need to talk about getting some more trades booked by 4 PM" may be trade language due to the presence of a time that correlates to 4 PM (which may be identified as an important time according to the data that trained the model) and the mention of trades. According to some embodiments, a region classifier may be created by providing a sample set of documents with regions or sentences that have been marked as either positive or negative examples of the type of region that is being classified, and then the system may apply machine learning algorithms to generate a probabilistic model that can be applied to any previously unknown document region and provide a decision and a confidence level regarding whether the unknown document region is a part of that class.

According to some embodiments, metadata patterns may be used to identify patterns in documents. Metadata patterns may be applied to a document's metadata to determine whether the pattern matches data in the metadata of the document. Metadata patterns may include document date/time, email sender/recipient whitelists, domain whitelists, self addressed email detection, and inbound/outbound email marking. Date/time metadata patterns may allow a user to define specific days of the month, days of the week, or times of date that may be of interest as a pattern. For example, a metadata pattern may include whether an email was sent on a Friday, or whether an email was sent near a trading floor's closing time.

An email sender/recipient whitelist pattern may allow a user to specify the relevant names of interest of senders or receivers of communications such as email. A domain whitelist pattern may allow a user to specify relevant domains of interest to identify communications coming or going to those domains. A self-addressed email pattern may allow the system to determine if a user has sent an email to his/her own personal account. In some embodiments, this may incorporate an assumption that a user may use the same portion of their own name that is present in their corporate account in their personal account. For example, if John Smith's corporate email is john.smith@company.com, a system may determine that johnsm@yahoo.com or smit@gmail.com may also belong to John Smith. Inbound/outbound email marking patterns may allow the system to identify communications that are being sent from within an organization to an outside party or vice versa, as opposed to communications which are being sent internally to the organization.

Figure 9:
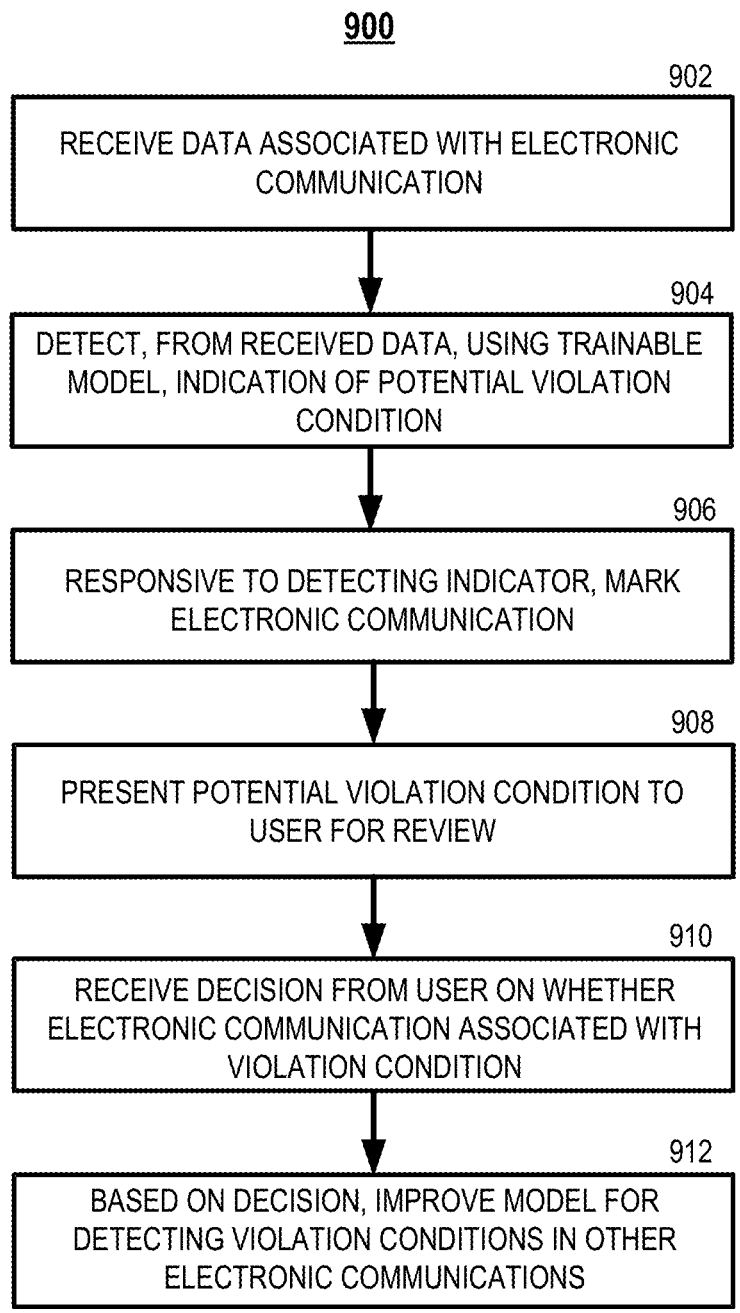
FIG. 9 is a flow diagram illustrating operations of a method in accordance with one embodiment.

FIG. 9 is a flow diagram illustrating operations of a method for identifying potential violation conditions from electronic communications, in accordance with one embodiment. As shown, at step 902, data associated with an electronic communication is received. At step 904, an indicator of a potential violation condition is detected from the received data, using a trainable model. The violation condition is associated with an activity, which may be a human activity, that is a violation of a predetermined standard. At step 906, in response to detecting the indicator of the potential violation condition, the electronic communication is marked (i.e., flagged or otherwise notated) as being associated with a potential violation condition. At step 908, the potential violation condition is presented to a user for review. At step 910, a decision is received from the user, based on the review, as to whether the electronic communication is associated with a violation condition, and at step 912, the model is improved for detecting potential violation conditions in other electronic communications.

The received data may include text data and/or metadata associated with the electronic communication. The text data may correspond to text content of a message and/or advertisement. The metadata may include an identifier of a sender or recipient, a time stamp, a domain, and/or a server.

The electronic communication may be a communication between humans, and the predetermined standard may be a legal or ethical standard.

The trainable model may be configured to generate a prediction that the indicator identifies a violation condition. The indicator may include a language pattern indicative of a violation condition. The indicator may include a collection of features defining a particular behavioral pattern indicative of a violation condition.

The indicator may be detected based at least in part on a context of the electronic communication. The indicator is detected based at least in part on at least one of domain, audience, and tone associated with the electronic communication.

The step 906 of marking the electronic communication as being associated with a potential violation condition may include flagging one or more specific portions of the electronic communication or the entire electronic communication as being associated with a potential violation condition.

The step 908 of presenting the potential violation condition to the user for review may include generating and/or sending an alert to the user. Step 908 may include presenting some or all of the electronic communication to the user.

The decision from the user may include a decision to discard the electronic communication from being considered as associated with a potential violation condition, a decision to escalate the electronic communication to a higher authority user for review, or a decision to confirm that the electronic communication is associated with a potential violation condition. The decision may include an indication of a true positive, false positive, true negative, or false negative in relation to a potential violation condition. The decision may be associated with a degree or weighting of the electronic communication as indicating a potential violation condition.

The step 912 of improving the model may include adjusting feature selection, feature weighting, and/or alerting thresholds. Adjusting feature selection and/or weighting, and/or alerting thresholds may include one or more of: retaining a particular feature for future runs of the model; adding a new feature; raising or lowering a weighting of a particular feature; and raising or lowering an alerting threshold.

The indicator of the potential violation condition may be one of a plurality of possible indicators of potential violation conditions, and the step 912 of improving the model may include adding an indicator to the plurality of possible indicators. The step 912 may include assigning a weighting to the added indicator.

The indicator of the potential violation condition may be one of a plurality of possible indicators of potential violation conditions, and the step 912 of improving the model may include selecting one or more particular indicators of the plurality of possible indicators for future runs of the model.

FIG. 10 is a diagram illustrating architecture of an exemplary system 1000 for machine learning in which one or more example embodiments described herein may be implemented. As shown, the system 1000 includes a user computer 1004 operated by a user 1002. The user computer 1004 can include some or all of the components of the computer 1300 shown in FIG. 13 and described in further detail below. A user interface such as a graphical user interface executing on the computer 1004 may be configured to receive user input 1005. By interacting with the user interface of the user computer 1004, the user 1002 may perform, via a model training client 1006, functions associated with supervised model training according to some embodiments described herein. The user interface may provide one or more functionalities associated with the user interfaces shown in FIGS. 3-8. Generated models such as enhanced models 1016 may be provided to other applications or components (collectively represented by reference numeral 1020) for performing various natural language processing (NLP) functions at other locations in a larger system and/or using resources provided across multiple devices of a distributed computing system. A base model may be used to predict identifications of potential violation conditions for a first electronic communication such as a message. Users 1002 such as analysts may then correct any incorrect predictions, add new identifications, add definitions, input new features or change weighting of previous features, add notations, etc. The resulting corrected data may then be used to train a new model based on just the corrections and/or additions made to the predictions on the first electronic communication. This new model may then be used to predict identifications on a second electronic communication. The corrections made to predictions on the second electronic communication may then be used to create a new model and predict identifications on a third electronic communication, and so on accordingly. This prediction, correction, and training process may progressively improve a model as additional electronic communications are processed.

Improved identification 1010, training 1014, predictions 1018, and predicted identification operations 1008 may be managed via the model training client 1006. Training 1014, prediction 1018, and storage of enhanced models 1016 can be implemented on the user computer 1004 or another computer 1012, which may be locally or remotely coupled to and in communication with user computer 1004, via a communication link such as a wired or wireless network connection. The computer 1012 may include some or all of the components of the computer 1300 shown in FIG. 13.

Figure 11:
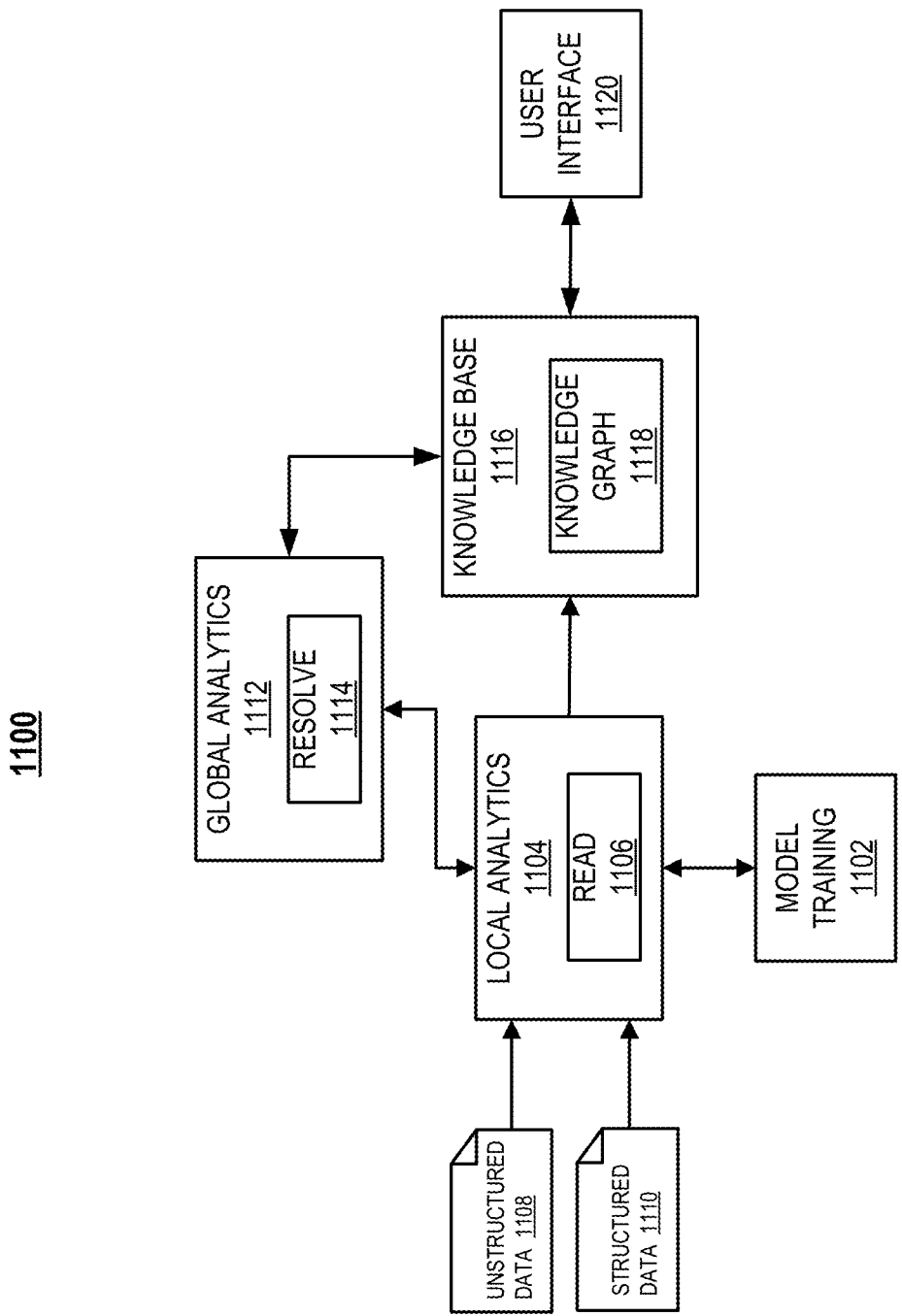
FIG. 11 is an overview diagram of a system for reading and analyzing data for implementing one or more embodiments.
Figure 12:
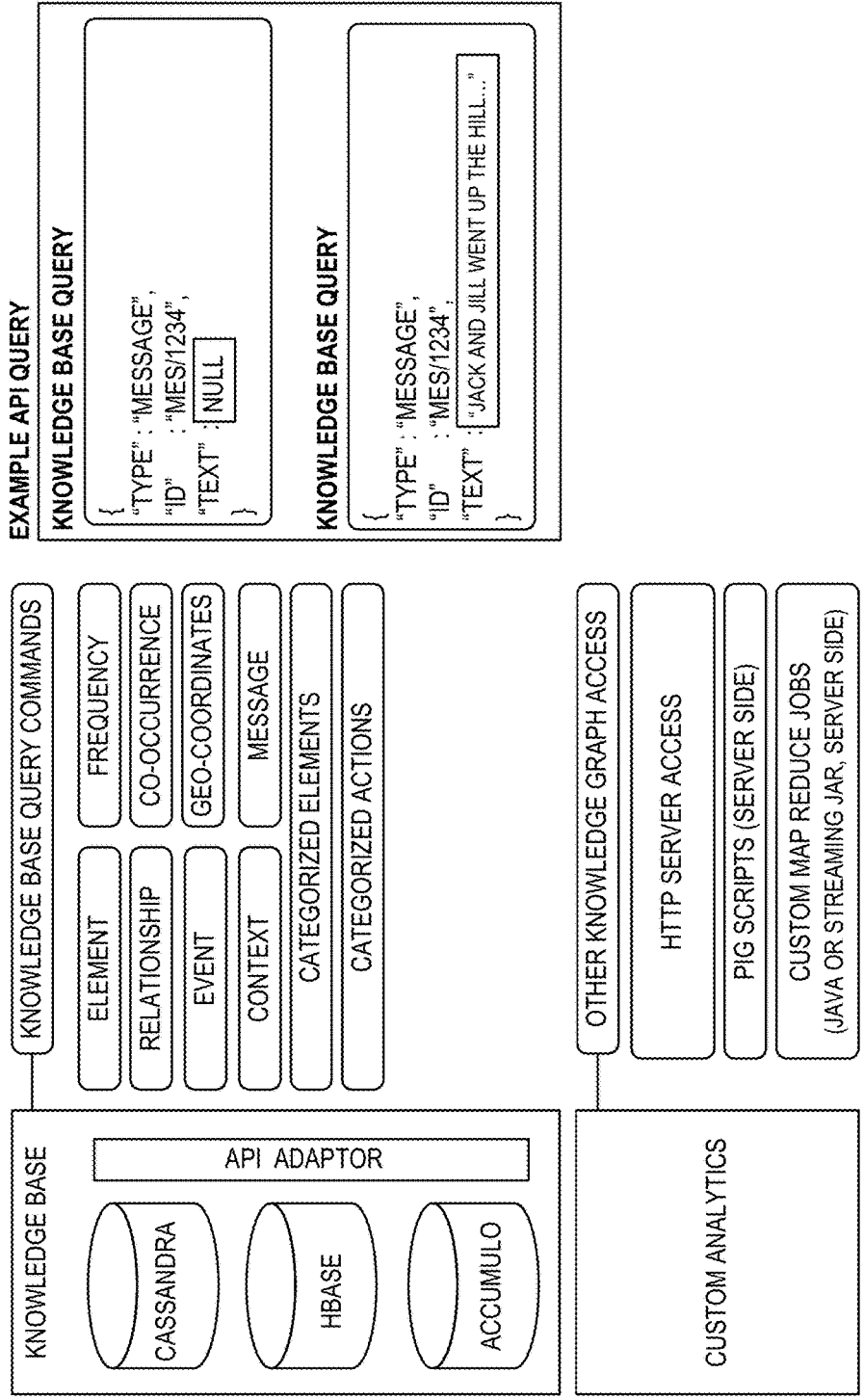
FIG. 12 illustrates an architecture of a system for accessing data and analysis related to some aspects shown in FIG. 11.

Now referring to FIGS. 11 and 12, as described in some detail above, in some embodiments, the present disclosure can provide for implementing analytics using both supervised and unsupervised machine learning techniques. Supervised mathematical models can encode a variety of different data features and associated weight information, which can be stored in a data file and used to reconstruct a model at run-time. The features utilized by these models may be determined by linguists and developers, and may be fixed at model training time. Models can be retrained at any time, but retraining may be done more infrequently once models reach certain levels of accuracy. Such approaches can be used to capture linguistic phenomena by utilizing the models to label sequences of characters/tokens/elements with the correct linguistic information that a model was created to predict. A supervised approach can comprise two phases: a training phase to identify those features that are significant for determining the correct label sequencing implemented by that model; and a run-time labeling phase that employs inference algorithms to assign attributes to the text being processed.

Training can be performed by passing annotated data to a machine-learning training algorithm that creates an appropriate model. This data can be represented as vectors of features ("feature vectors"). Such machine-learning training algorithms can learn the weights of features and persist them in a model so that inference algorithms can use the model to predict a correct label sequence to assign to the terms as they are being processed. The use of statistical models can provide for a degree of language independence because the same underlying algorithms can be used to predict correct labeling sequences; the process may slightly differ just in using a different set of models. For each language, a new model can be created for each machine learning function, using the language to identify significant features important to that model.

In accordance with some embodiments, a graph of global enterprise knowledge from data may be formed, with integration of a set of knowledge services in the form of a Application Programming Interface (API) to access a Knowledge Graph (KG) abstracted from the data. Now specifically referring to FIG. 11, according to some embodiments of the present disclosure, in order to assemble a Knowledge Graph from both unstructured data 1108 and structured data 1110, an analytical workflow can perform processes which may be generally described in terms of three main functional phases: "Read", "Resolve", and "Reason", where each phase includes particular functional processes. In the Read phase (see, e.g., "Read" at block 1106), unstructured data 1108 (e.g., web, email, instant messaging, or social media data) and structured data 1110 (e.g., customer information, orders or trades, transactions, or reference data) can be ingested and natural language processing (NLP), entity extraction, and fact extraction can be performed. As non-limiting examples, unstructured data 1108 may be accepted in a UTF-8 text format, and structured data 1110 may be accepted in a specified XML format, among other data formats.

In the Resolve phase (see, e.g., "Resolve" at block 1114), results from the Read phase can be assembled, organized, and related to perform global concept resolution and detect synonyms (e.g., synonym generation) and closely related concepts. In the Reason phase, spatial and temporal reasoning may be applied and relationships uncovered that can allow resolved entities to be compared and correlated using various graph analysis techniques. The Reason phase can utilize "reasoners" of Global Analytics 1112, where functions of Resolve 1114 may be considered a type of reasoner. Various aspects of an analytical workflow that can utilize the Read, Resolve, and Reason phases may be performed in a distributed processing environment, and the results can be stored into a unified entity storage architecture which may be referred to herein as a "Knowledge Base" 1116.

As illustrated in FIG. 11, systems and methods according to some embodiments can utilize "Local Analytics" processes 1104, which can include processes in accordance with the Read phase 1106 and may include reading messages and enriching them with semantic annotations based on algorithms that utilize a priori models created from model training 1102 and static background knowledge. Enrichment in Local Analytics 1104 may use structured prediction algorithms and classification algorithms. These algorithms may be supervised or semi-supervised and may utilize model training 1102. Output of Local Analytics processes 1104 can include a message with the annotations populated from the analytics, which may be aggregated into an annotated message store of the Knowledge Base 1116.

The Knowledge Base 1116 can be a unified entity storage architecture that can perform at scale for both data insertion as well as data querying. In some embodiments, the Knowledge Base 1116 can be a combination of persistent storage and intelligent data caching that can enable rapid storage and retrieval of entities, concepts, relationships, text documents and related metadata. This can include the text content of messages, the categorized individual tokens and semantic token groups comprising those messages and metadata such as properties, relationships, and events.

The Knowledge Base 1116 can provide storage and indexing for annotated messages, where indexing may be passive and may not require active maintenance to support new analytics. An annotated message store can run locally or can be distributed over many systems. The Knowledge Base 1116 may provide for searches based on message ID, strings, any annotation value or composition of annotation values, and/or ranges of positions. The Knowledge Base 1116 may additionally or alternatively contain a Knowledge Graph 1118 representation of the system. The Knowledge Graph 1118 may be derived through Global Analytics 1112, (which, as mentioned previously, may also be referred to as "Advanced Analytics") and may provide features to Global Analytics 112 to enable the creation of the Knowledge Graph 1118.

In some embodiments, Global Analytics processes 1112 can take features from annotated message storage and run algorithms against aggregated (or global) metadata contained therein to produce, maintain, and enrich a unified representation of knowledge learned from the original data that may be stored in the Knowledge Graph 1118. This may include the resolution of references yielding the creation of concepts, categories, and relationships through clustering, similarity, and ranking algorithms. At a functional level, Resolve 1114 can be considered a reasoner of Global Analytics 1112.

Kinds of analytic algorithms that may be used in Global Analytics 1112 at a formal level can include clustering (including hierarchical), nearest neighbor, ranking, maximum a posteri (MAP) inference, and expectation maximization. The clustering, nearest neighbor, and ranking type algorithms have a family resemblance in that they can calculate relative similarity or dissimilarity between different classes or sets of objects based on features and then either return a ranked list or a partition of the objects into sets with some rationale. MAP and expectation maximization may share a family resemblance in predicting a best candidate or range of candidates given a set of condition of the Knowledge Graph 1118 at the time of evaluation.

According to some embodiments, a distributed map framework that can be used for Local Analytics 1104 can be instantiated using, for example, currently available HADOOP Map/Reduce or STORM streaming technology. This can provide for a batch data ingestion process or a streaming ingestion process (i.e., documents are fed in as they arrive in real time). According to some example embodiments, Global Analytics 1112 processes can be instantiated as HADOOP Map/Reduce jobs, and this process may be executed periodically to incorporate new data being added to the Knowledge Base 1116 in corpus-wide analytics processing. Global Analytics processes 1112 can read data generated by Local Analytics 1104 from the Knowledge Base 1116, using a customized API to perform bulk reads of the required data. A particularized API task performing the data reads can be instantiated as HADOOP Map/Reduce processes, for example.

Now also referring to the diagram 1200 of FIG. 12, according to some embodiments of the present disclosure, the data and analysis contained in the Knowledge Base 1116 can be accessed in a number of ways, for example via a user interface 1120, which may be a graphical user interface and may include functionality described with respect to user interfaces in accordance with embodiments shown in FIGS. 3-8. A particularized API layer can enable organizations and developers to integrate aspects of the present disclosure with third party applications (e.g., business intelligence tools, search and discovery tools) or create customized user interfaces that utilize results of the analysis. These can include a set of Knowledge Queries via a "Knowledge Base Query Language" (KBQL) in accordance with the present disclosure, module commands that can provide access to specific functions performed by some modules in accordance with the present disclosure, and through IMPALA. Utilizing IMPALA, users can query data using SQL-like syntax, including SELECT, JOIN, and aggregate functions—in real time. This can use the same metadata, SQL syntax, ODBC driver and user interface as APACHE HIVE making the transition substantially seamless when moving from Apache Hive to Impala. KBQL according to some embodiments is a query format, based on the MQL specification published as part of the FREEBASE project to serve as a JSON-based (JavaScript Object Notation) query language. For web developers using JavaScript, JSON is trivially transformed into JavaScript objects so it can be particularly convenient for work in which a browser-based user interface is involved. Because the Freebase project's MQL usage is not mapped out as formal language, there is no set schema to be designed against. Standard KBQL requests may include operations for standard CRUD (create, read, update, delete) operations. The KBQL query engine can support create and read query types for the most common object types, with some support for update queries for specific object types. Because KBQL commands can be built on a JSON based query language, it may be intuitive to use JSON objects to specify the input parameters for this command form. The input parameters can be placed into a JSON object, and then passed to the server in the request body. The result can be passed back to the client in a JSON object with the same format as the one passed in the request body.

In accordance with some embodiments, a custom JAVA API (which may also be referred to as "Reaper") can support high-performance bulk export operations on data tables in the Knowledge Base to support creation of custom analytics, data views, and data exports. It may be noted that this is not a run-time API from a specific server. These tables can be accessed from specific backend storage technology being employed, such as CASSANDRA, HBASE, or ACCUMULO. The Reaper API can expose core data structures through documented business objects that conform to standard interfaces. Specifically, an input formal JAVA class can be provided for each data type supported by the interface. This input format can tell HADOOP how to break the bulk read operation into separate tasks that utilize the HADOOP Map/Reduce distributed execution environment, allowing the bulk export function to scale to the amount of available hardware in the HADOOP cluster. The Global Analytics processes can also utilize the Reaper API to read the data from the Knowledge Graph that was generated by Local Analytics processes.

In some embodiments, a Knowledge Graph can be built automatically from public and private data in near real-time. A graph may be assembled with no prior knowledge of the data and can visually represent resolved entities in time and space. The entities can appear as nodes in the graph and contain aggregated knowledge about that entity (e.g., when/where they were born, when/where they went to school, and/or when/where they worked). The Knowledge Graph can graphically represent the information that has been extracted from a corpus, for example information extracted via one or more functions in accordance with the Read phase. A Knowledge Graph can be viewed as two separate and related sub-graphs: the knowledge sub-graph identifying the entities present in text and the relationships between them; and the information sub-graph which identifies the specific pieces of information that act as evidence/support for the knowledge sub-graph. The information sub-graph can contain message nodes, mention nodes, assertion nodes, and location nodes. Each message node can represent a single document from a corpus and can contain metadata information about the document in addition to its text and any document-level analysis artifacts (e.g., tokenization, part-of-speech assignment, name identification) from the Read phase. The text of a message can refer to entities and describe various ways in which they interact. These entities can be represented in the information sub-graph by mention nodes. Each mention node can represent a coreference chain (one or more textual references to an entity) from a single document identified from the local coreference output of Read processes.

The nodes in a Knowledge Graph can represent analytic results, features, and properties. Features and properties can be key-value pairs attached to nodes. Additionally, these nodes may have relationships to other nodes in the graph ("edges"). For example, a node may represent a single word of text (or "token"). That node may then have a child relationship to a node representing the phrase of which the word is a part (a "chunk"). The chunk node may have other children, representing other words in the phrase. Each of these nodes may have additional properties, describing the analytic component that generated the node, a confidence associated with the node, and so on.

Some embodiments can provide for easy browsing and searching of concepts in the Knowledge Graph by querying knowledge objects and visualizing captured information in a clean and intuitive graphical user interface, which may be web-based. In some embodiments, a user can be presented with a list of the most active concepts in their database. The user can expand the time frame and filter results by concept category, so that they are presented with, for example, a list of the people who have been the most active in the last 30 days. When a user decides to investigate a given concept, in some embodiments an entity profile can provided that may list key attributes such as aliases, date of birth and death, places of residence, organization memberships, titles, spouses, siblings, and/or children. The profile can also provide an interactive timeline that shows the number of times the concept is mentioned on any given date. A newsfeed can be tied to this timeline, and sentences may be displayed, where the concept appears as part of a subject-predicate-object triple during the selected period of time. Additionally, the newsfeed can display how long ago the action took place, the name of the document that reported the information, and the total number of documents that made the same statement. This news can also be filtered by predicate category, enabling the user easily view specific types of interactions, such as communication or travel.

As described in some detail above, the Read, Resolve, and Reason phases can provide for building and exploring a graph of global enterprise knowledge. Mentions of entities can be identified during the Read phase and combined and organized into a graph of entities and relationships between them in the Resolve phase. In the Reason phase, information inherent in the Knowledge Graph can be extracted and provided as actionable insights for a user.

In some aspects of the Read phase in accordance with some embodiments, as data is read in, text of the data can first be broken up into its foundational building blocks using a multi-stage natural language processing (NLP) process. The NLP process can comprise determining sentence boundaries, then breaking up the text into "tokens." Each token can consist of a word, punctuation mark, or special character. Each token can then be analyzed and assigned a grammatical part of speech (POS) tag (e.g., proper noun, adjective, adverb). The tokens can be further analyzed to determine if adjacent tokens should be cojoined together if they describe the same concept. For example, if "John" and "Smith" were adjacent to each other, they can be co-joined to form "John Smith" as a single concept. Other types of examples can include titles or company names. This process may be referred to as chunking, which creates the elements (or entities) that can be used by downstream analytics. A next step can be to analyze each chunk to determine if it belongs to a predefined category. Examples of categories can include people, organizations, businesses, and vehicles. A library (e.g., lexicon) of predefined categories may be provided, or users may create their own custom categories using various training applications as described above.

Upon completion, the text has been broken down into its constituent parts, forming a basic foundation of contextual meaning. Using this foundation, other analytic functions can then be performed, such as identifying and cataloging significant activities (or assertions) between entities. In a grammatical sense, these can be looked at as subject-predicate-object triples, as they describe specific activities that occur between entities (e.g., a person, place, or thing). These assertions can then be categorized to describe specific types of activities, such as communications activities and/or purchase/acquisition activities. Other analytics can include identifying and cataloging temporal and spatial references found in the text, including indirect references to time and location. For example, if the date of a document is known, a temporal reference to "next Thursday" can be assigned the correct date based on the document date.

In some embodiments, a second phase of the Read, Resolve, and Reason workflow is the Resolve phase. Analytics performed by Resolve processes can be more global in nature and span all documents processed by the Read phase. In some embodiments, Resolve can be particularly privileged to make updates, deletions, and bootstrap the full structure of the Knowledge Graph. Entity resolution can generally refer to a process of determining whether two expressions (or "mentions") in natural language text refer to the same entity. Given a collection of mentions of entities extracted from a body of text, mentions may be grouped such that two mentions belong to the same group ("cluster") if they refer to the same entity. It may be recognized that an entity is coreferent with and refers to the same entity or that information associated with the entity is referring to multiple distinct real-world individuals. Entity resolution according to some embodiments of the present disclosure can address an existing problem of identifying the correct entity named by each mention (e.g., names, pronoun, and noun references).

Regarding global entity resolution, across the data, a specific entity may be referred to in a number of different ways. Although the specific string value may be different across all of these mentions, they may all refer to the same person. According to some embodiments, contextual similarity of usage can be utilized, as can properties associated with an entity and other algorithms, to group all of these references into what can be referred to as a globally resolved concept.

In some example embodiments, in the Resolve phase, similar concepts can be identified based on their usage in context (e.g., synonym generation). A core premise of this analysis can be that language should be treated as a signal composed of symbols between agents. The encoding of meaning into the signal can be done through consistent selection of symbols that have stable histories of interactions (e.g., co-occurrences) within short attention ranges over a longer global history of usage related to these symbols. The pattern of usage of a particular entity, taken globally, can form a signature. Entities that have similar usage patterns or signatures can be related semantically. Algorithms used to perform this analysis can provide a mathematical formalization and computation for that notion of similarity. This analysis can be useful for identifying both explicit and implicit relationships between people or other entities.

In some embodiments, a third phase of the Read, Resolve, and Reason workflow is Reason. Functions of the Reason phase of analysis can operate to understand and correlate all of the information discovered in the prior two phases to include important people, places, events, and relationships uncovered in the data. According to some embodiments, this can be accomplished by amplifying human intelligence through a variety of algorithms to manipulate the collection of concepts and relationships that ultimately help end users answer questions. In accordance with some embodiments, reasoning processes (Reason phase) may refer to the use or manipulation of concepts and relationships to answer end user questions. Reasoning may be primitive (atomic) or complex (e.g., orchestrated to support a specific business use case).

Figure 13:
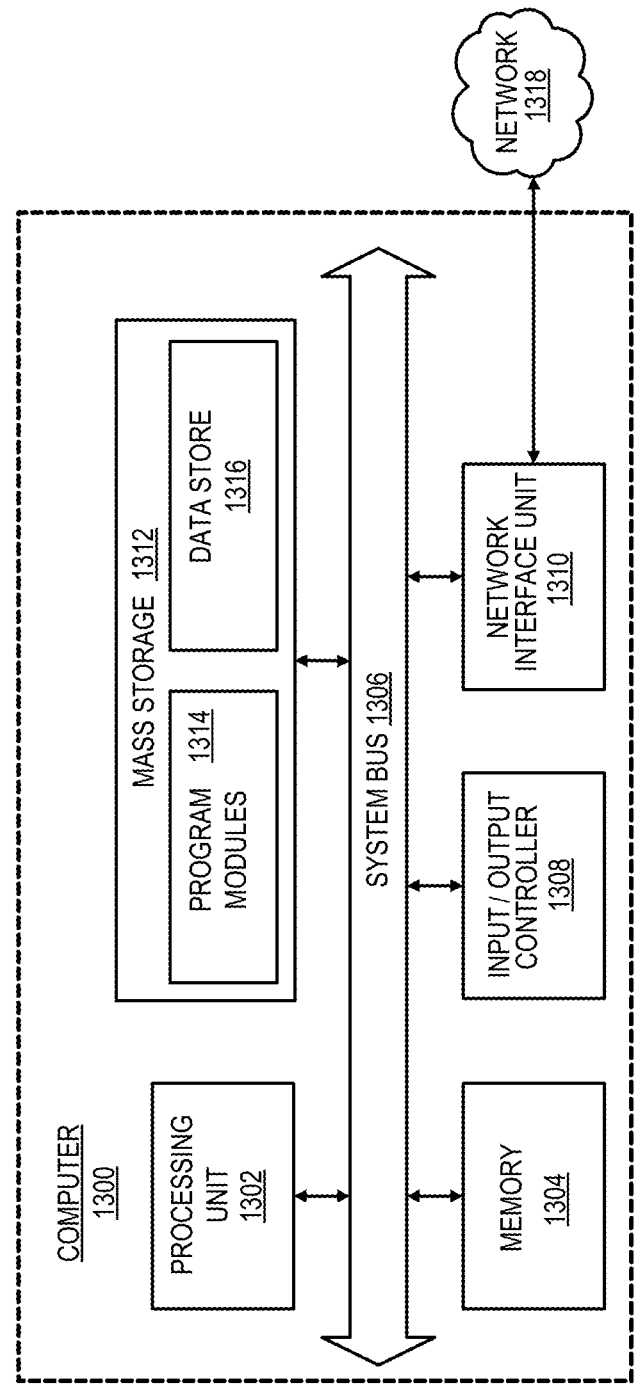
FIG. 13 is a computer architecture diagram illustrating a computer hardware architecture for a computing system capable of implementing one or more embodiments.

FIG. 13 is a computer architecture diagram showing a general computing system capable of implementing one or more embodiments of the present disclosure described herein. A computer 1300 may be configured to perform one or more functions associated with embodiments illustrated in one or more of FIGS. 1-12, for example one or more steps of the method 900 shown in FIG. 9. It should be appreciated that the computer 1300 may be implemented within a single computing device or a computing system formed with multiple connected computing devices. For example, the computer 1300 may be configured for a server computer, desktop computer, laptop computer, or mobile computing device such as a smartphone or tablet computer, or the computer 1300 may be configured to perform various distributed computing tasks, which may distribute processing and/or storage resources among the multiple devices.

As shown, the computer 1300 includes a processing unit 1302, a system memory 1304, and a system bus 1306 that couples the memory 1304 to the processing unit 1302. The computer 1300 further includes a mass storage device 1312 for storing program modules. The program modules 1314 may include modules executable to perform one or more functions associated with embodiments illustrated in one or more of FIGS. 1-12. For example, the program modules 1314 may be executable to perform one or more of the functions for identifying violation conditions from electronic communications as described above. The mass storage device 1312 further includes a data store 1316, which may be configured to function as, for example, the Knowledge Base and/or message store described above with respect to the embodiments shown in FIG. 11.

The mass storage device 1312 is connected to the processing unit 1302 through a mass storage controller (not shown) connected to the bus 1306. The mass storage device 1312 and its associated computer storage media provide non-volatile storage for the computer 1300. By way of example, and not limitation, computer-readable storage media (also referred to herein as "computer-readable storage media" or "computer-storage media" or "computer-storage medium") may include volatile and non-volatile, removable and non-removable media implemented in any method or technology for storage of information such as computer-storage instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 1300. Computer-readable storage media as described herein does not include transitory signals.

According to various embodiments, the computer 1300 may operate in a networked environment using connections to other local or remote computers through a network 1318 via a network interface unit 1310 connected to the bus 1306. The network interface unit 1310 may facilitate connection of the computing device inputs and outputs to one or more suitable networks and/or connections such as a local area network (LAN), a wide area network (WAN), the Internet, a cellular network, a radio frequency network, a Bluetooth-enabled network, a Wi-Fi enabled network, a satellite-based network, or other wired and/or wireless networks for communication with external devices and/or systems. The computer 1300 may also include an input/output controller 1308 for receiving and processing input from a number of input devices. Input devices may include, but are not limited to, keyboards, mice, stylus, touchscreens, microphones, audio capturing devices, or image/video capturing devices. An end user may utilize such input devices to interact with a user interface, for example a graphical user interface, for managing various functions performed by the computer 1300.

The bus 1306 may enable the processing unit 1302 to read code and/or data to/from the mass storage device 1312 or other computer-storage media. The computer-storage media may represent apparatus in the form of storage elements that are implemented using any suitable technology, including but not limited to semiconductors, magnetic materials, optics, or the like. The program modules 1314 may include software instructions that, when loaded into the processing unit 1302 and executed, cause the computer 1300 to provide functions associated with embodiments illustrated in FIGS. 1-12. The program modules 1314 may also provide various tools or techniques by which the computer 1300 may participate within the overall systems or operating environments using the components, flows, and data structures discussed throughout this description. In general, the program module 1314 may, when loaded into the processing unit 1302 and executed, transform the processing unit 1302 and the overall computer 1300 from a general-purpose computing system into a special-purpose computing system.

The processing unit 1302 may be constructed from any number of transistors or other discrete circuit elements, which may individually or collectively assume any number of states. More specifically, the processing unit 1302 may operate as a finite-state machine, in response to executable instructions contained within the program modules 1314. These computer-executable instructions may transform the processing unit 1302 by specifying how the processing unit 1302 transitions between states, thereby transforming the transistors or other discrete hardware elements constituting the processing unit 1302. Encoding the program modules 1314 may also transform the physical structure of the computer-readable storage media. The specific transformation of physical structure may depend on various factors, in different implementations of this description. Examples of such factors may include, but are not limited to: the technology used to implement the computer-readable storage media, whether the computer-readable storage media are characterized as primary or secondary storage, and the like. For example, if the computer-readable storage media are implemented as semiconductor-based memory, the program modules 1314 may transform the physical state of the semiconductor memory, when the software is encoded therein. For example, the program modules 1314 may transform the state of transistors, capacitors, or other discrete circuit elements constituting the semiconductor memory.

As another example, the computer-storage media may be implemented using magnetic or optical technology. In such implementations, the program modules 1314 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present disclosure.

Although some embodiments described herein have been described in language specific to computer structural features, methodological acts and by computer readable media, it is to be understood that the disclosure defined in the appended claims is not necessarily limited to the specific structures, acts or media described. Therefore, the specific structural features, acts and mediums are disclosed as exemplary embodiments implementing the claimed disclosure.

The various embodiments described above are provided by way of illustration only and should not be construed to limit the scope of the present disclosure. Those skilled in the art will readily recognize various modifications and changes that may be made to the present disclosure without following the example embodiments and applications illustrated and described herein, and without departing from the true spirit and scope of the disclosure as set forth in the appended claims.

What is claimed is:

1. A computer-implemented method, comprising:
   receiving data associated with an electronic communication, the data comprising text data of text content from the body of at least one of a plurality of messages and a plurality of advertisements;
   determining semantic meaning of the text content based at least in part on contextual usage of words in the text content;
   detecting, from the received data, and using an unsupervised machine learning model, at least one indicator of a potential violation condition, wherein a violation condition is associated with a human activity that is a violation of a predetermined standard,
      wherein the detecting of the at least one indicator is based at least in part on the determined semantic meaning and comprises performing entity resolution on the text data, across the at least one of the plurality of messages and plurality of advertisements, to resolve coreferent mentions to entities, wherein the coreferent mentions comprise a plurality of aliases corresponding to the same person and resolving the coreferent mentions comprises determining that the plurality of aliases refer to the same person, and
      wherein the at least one indicator is comprised of features defining behavioral patterns of one or more particular individuals, and the behavioral patterns comprise a plurality of actions by the one or more individuals;
   responsive to detecting the at least one indicator of the potential violation condition, marking the electronic communication as being associated with a potential violation condition;
   presenting the potential violation condition to a reviewing user for review, wherein the reviewing user is the first user or a second user;
   receiving a decision from the reviewing user, based on the review, on whether the electronic communication is associated with a violation condition; and
   based on the decision, adjusting at least one of feature selection, pattern selection, feature weighting, pattern weighting, and alerting thresholds, to improve the accuracy of the unsupervised machine learning model used for detecting potential violation conditions.

2. The method of claim 1, wherein the received data further comprises metadata associated with the electronic communication.

3. The method of claim 2, wherein the metadata comprises an identifier of at least one of a sender or recipient, a time stamp, a domain, and a server.

4. The method of claim 1, wherein the electronic communication is a communication between humans.

5. The method of claim 1, wherein the predetermined standard is a legal or ethical standard.

6. The method of claim 1, wherein the model is configured to generate a prediction that the indicator identifies a violation condition.

7. The method of claim 1, wherein the at least one indicator comprises a language pattern indicative of a violation condition.

8. The method of claim 1, wherein the at least one indicator is detected based at least in part on a context of the electronic communication.

9. The method of claim 1, wherein the at least one indicator is detected based at least in part on at least one of domain, audience, and tone associated with the electronic communication.

10. The method of claim 1, wherein marking the electronic communication as being associated with a potential violation condition comprises flagging one or more specific portions of the electronic communication or the entire electronic communication as being associated with a potential violation condition.

11. The method of claim 1, wherein presenting the potential violation condition to the reviewing user for review comprises at least one of generating and sending an alert to the reviewing user.

12. The method of claim 1, wherein presenting the potential violation condition to the reviewing user for review comprises presenting some or all of the electronic communication to the reviewing user.

13. The method of claim 1, wherein the decision from the reviewing user comprises a decision to discard the electronic communication from being considered as associated with a potential violation condition, a decision to escalate the electronic communication to a higher authority user for review, or a decision to confirm that the electronic communication is associated with a potential violation condition.

14. The method of claim 13, wherein the decision comprises an indication of a true positive, false positive, true negative, or false negative in relation to a potential violation condition.

15. The method of claim 13, wherein the decision is associated with a degree or weighting of the electronic communication as indicating a potential violation condition.

16. The method of claim 1, wherein improving the accuracy of the model comprises adjusting at least one of feature selection, pattern selection, feature weighting, pattern weighting, and alerting thresholds.

17. The method of claim 1, wherein the at least one indicator of the potential violation condition is one of a plurality of possible indicators of potential violation conditions, and wherein improving the accuracy of the model comprises adding an indicator to the plurality of possible indicators.

18. The method of claim 17, wherein improving the accuracy of the model comprises assigning a weighting to the added indicator.

19. The method of claim 17, wherein the at least one indicator of the potential violation condition is one of a plurality of possible indicators of potential violation conditions, and wherein improving the accuracy of the model comprises selecting one or more particular indicators of the plurality of possible indicators for future runs of the model.

20. The method of claim 1, wherein the at least one indicator comprises one or more indicators created by the first user.

21. The method of claim 1, wherein the at least one indicator comprises a combination of features or patterns that is indicative of unauthorized financial activity by the one or more individuals.

22. The method of claim 21, wherein the unauthorized financial activity comprises at least one of insider trading, bribery, and money laundering.

23. The method of claim 1, wherein the at least one indicator comprises a combination of features or patterns that is indicative of illegal activities associated with sexual services.

24. The method of claim 1, wherein the at least one indicator comprises a combination of features or patterns associated with human trafficking.

25. The method of claim 1, wherein adjusting at least one of feature selection, pattern selection, feature weighting, pattern weighting, and alerting thresholds comprises at least one of:
   retaining a particular feature for future runs of the model;
   adding a new feature;
   raising or lowering a weighting of a particular feature; and
   raising or lowering an alerting threshold.

26. The method of claim 1, wherein performing the entity resolution on the text data comprises resolving the plurality of aliases based on contextual features associated with the context of usage of the plurality of aliases across the at least one of the plurality of messages and plurality of advertisements.

27. The method of claim 26, wherein the contextual features associated with the context of usage of the plurality of aliases include contextual features corresponding to geographic locations of the same person across the at least one of the plurality of messages and plurality of advertisements.

28. The method of claim 26, wherein the contextual features associated with the context of usage include contextual features corresponding to consistency of actions of the same person across the at least one of the plurality of messages and plurality of advertisements.

29. A system, comprising: one or more processors; and at least one memory device storing instructions which, when executed by the one or more processors, cause the system to perform functions that include: receiving data associated with an electronic communication, the data comprising text data of text content from the body of at least one of a plurality of messages and a plurality of advertisements; determining semantic meaning of the text content based at least in part on contextual usage of words in the text content; detecting, from the received data, and using an unsupervised machine learning model, at least one indicator of a potential violation condition, wherein a violation condition is associated with a human activity that is a violation of a predetermined standard, wherein the detecting of the at least one indicator is based at least in part on the determined semantic meaning and comprises performing entity resolution on the text data, across the at least one of the plurality of messages and plurality of advertisements, to resolve coreferent mentions to entities, wherein the coreferent mentions comprise a plurality of aliases corresponding to the same person and resolving the coreferent mentions comprises determining that the plurality of aliases refer to the same person, and wherein the at least one indicator is comprised of features defining behavioral patterns of one or more particular individuals, and the behavioral patterns comprise a plurality of actions by the one or more individuals; responsive to detecting the at least one indicator of the potential violation condition, marking the electronic communication as being associated with a potential violation condition; presenting the potential violation condition to a reviewing user for review, wherein the reviewing user is the first user or a second user; receiving a decision from the reviewing user, based on the review, on whether the electronic communication is associated with a violation condition; and based on the decision, adjusting at least one of feature selection, pattern selection, feature weighting, pattern weighting, and alerting thresholds, to improve the accuracy of the unsupervised machine learning model used for detecting potential violation conditions.

30. A non-transitory computer-readable medium storing instructions which, when executed by one or more processors, cause a computing device to perform functions that comprise: receiving data associated with an electronic communication, the data comprising text data of text content from the body of at least one of a plurality of messages and a plurality of advertisements; determining semantic meaning of the text content based at least in part on contextual usage of words in the text content; detecting, from the received data, and using an unsupervised machine learning model, at least one indicator of a potential violation condition, wherein a violation condition is associated with a human activity that is a violation of a predetermined standard, wherein the detecting of the at least one indicator is based at least in part on the determined semantic meaning and comprises performing entity resolution on the text data, across the at least one of the plurality of message and plurality of advertisements, to resolve coreferent mentions to entities, wherein the coreferent mentions comprise a plurality of aliases corresponding to the same person and resolving the coreferent mentions comprises determining that the plurality of aliases refer to the same person, and Wherein the at least one indicator is comprised of features defining behavioral patterns of one or more particular individuals, and the behavioral patterns comprise a plurality of actions by the one or more individuals; responsive to detecting the at least one indicator of the potential violation condition, marking the electronic communication as being associated with a potential violation condition; presenting the potential violation condition to a reviewing user for review, wherein the reviewing user is the first user or a second user; receiving a decision from the reviewing user, based on the review, on whether the electronic communication is associated with a violation condition; and based on the decision, adjusting at least one of feature selection, pattern selection, feature weighting, pattern weighting, and alerting thresholds, to improve the accuracy of the unsupervised machine learning model used for detecting potential violation conditions.

* * * * *